US011693788B1

(12) United States Patent
Williams et al.

(10) Patent No.: US 11,693,788 B1
(45) Date of Patent: Jul. 4, 2023

(54) GATHERING TRANSLATION ENTRY INVALIDATION REQUESTS IN A DATA PROCESSING SYSTEM

(71) Applicant: INTERNATIONAL BUSINESS MACHINES CORPORATION, Armonk, NY (US)

(72) Inventors: Derek E. Williams, Round Rock, TX (US); Guy L. Guthrie, Austin, TX (US); Luke Murray, Austin, TX (US); Hugh Shen, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/834,505

(22) Filed: Jun. 7, 2022

(51) Int. Cl.
*G06F 12/1045* (2016.01)
*G06F 12/0811* (2016.01)
*G06F 12/1027* (2016.01)

(52) U.S. Cl.
CPC ...... *G06F 12/1045* (2013.01); *G06F 12/0811* (2013.01); *G06F 12/1027* (2013.01); *G06F 2212/681* (2013.01)

(58) Field of Classification Search
None
See application file for complete search history.

(56) References Cited

U.S. PATENT DOCUMENTS

| 10,067,870 | B2 | 9/2018 | Doshi | |
|---|---|---|---|---|
| 10,324,856 | B2 | 6/2019 | Lloyd | |
| 10,963,248 | B2 | 3/2021 | Lloyd | |
| 10,977,047 | B2 | 4/2021 | Lloyd | |
| 2018/0089094 | A1* | 3/2018 | Clancy | G06F 12/1063 |
| 2020/0183853 | A1* | 6/2020 | Williams | G06F 12/1027 |
| 2021/0026568 | A1* | 1/2021 | Swaine | G06F 12/1027 |
| 2022/0066941 | A1* | 3/2022 | Ramachandra | G06F 12/0875 |

OTHER PUBLICATIONS

Per-Thread Valid Bits for Multithreaded Effective to Real Address Translation (ERATs), ip.com, Mar. 1, 2004, accessed Jun. 6, 2022 from https://priorart.ip.com/IPCOM/000022179.

(Continued)

*Primary Examiner* — Kaushikkumar M Patel
(74) *Attorney, Agent, or Firm* — Brian F. Russell; Joseph P. Curcuru

(57) ABSTRACT

An arbiter gathers translation invalidation requests assigned to state machines of a lower-level cache into a set for joint handling in a processor core. The gathering includes selection of one of the set of gathered translation invalidation requests as an end-of-sequence (EOS) request. The arbiter issues to the processor core a sequence of the gathered translation invalidation requests terminating with the EOS request. Based on receipt of each of the gathered requests, the processor core invalidates any translation entries providing translation for the addresses specified by the translation invalidation requests and marks memory-referent requests dependent on the invalidated translation entries. Based on receipt of the EOS request and in response to all of the marked memory-referent requests draining from the processor core, the processor core issues a completion request to the lower-level cache indicating completion of servicing by the processor core of the set of gathered translation invalidation requests.

18 Claims, 13 Drawing Sheets

(56) References Cited

OTHER PUBLICATIONS

Scalable Multiprocessor Invalidation Mechanism, ip.com, Aug. 4, 2003, accessed Jun. 6, 2022 from https://priorart.ip.com/IPCOM/000018735.

Method for Sharing Translation Look-Aside Buffer Entries Between Logical Processors, ip.com, Jul. 30, 2003, accessed Jun. 6, 2022 from https://priorart.ip.com/IPCOM/000018663.

Power ISA Version 3.0 B, Mar. 29, 2017, 1258 pages, IBM, USA, accessed Jun. 6, 2022 from https://wiki.raptorcs.com/w/images/c/cb/PowerISA_public.v3.0B.pdf.

* cited by examiner

GATHERING TRANSLATION ENTRY INVALIDATION REQUESTS IN A DATA PROCESSING SYSTEM

BACKGROUND OF THE INVENTION

The present invention relates generally to data processing and, in particular, to translation entry invalidation in a data processing system.

A conventional multiprocessor (MP) computer system comprises multiple processing units (which can each include one or more processor cores and their various cache memories), input/output (I/O) devices, and data storage, which can include both system memory (which can be volatile or nonvolatile) and nonvolatile mass storage. In order to provide enough addresses for memory-mapped I/O operations and the data and instructions utilized by operating system and application software, MP computer systems typically reference an effective address space that includes a much larger number of effective addresses than the number of physical storage locations in the memory mapped I/O devices and system memory. Therefore, to perform memory-mapped I/O or to access system memory, a processor core within a computer system that utilizes effective addressing is required to translate an effective address into a real address assigned to a particular I/O device or a physical storage location within system memory.

In the POWER™ RISC architecture, the effective address space is partitioned into a number of uniformly-sized memory pages, where each page has a respective associated address descriptor called a page table entry (PTE). The PTE corresponding to a particular memory page contains the base effective address of the memory page as well as the associated base real address of the page frame, thereby enabling a processor core to translate any effective address within the memory page into a real address in system memory. The PTEs, which are created in system memory by the operating system and/or hypervisor software, are collected in a data structure commonly called a page frame table.

In order to expedite the translation of effective addresses to real addresses during the processing of memory-mapped I/O and memory access instructions (hereinafter, together referred to simply as "memory-referent instructions"), a conventional processor core often employs, among other translation structures, a cache referred to as a translation lookaside buffer (TLB) to buffer recently accessed PTEs within the processor core. Of course, as data are moved into and out of physical storage locations in system memory (e.g., in response to the invocation of a new process or a context switch), the entries in the TLB must be updated to reflect the presence of the new data, and the TLB entries associated with data removed from system memory (e.g., paged out to nonvolatile mass storage) must be invalidated. In many conventional processors such as the POWER™ line of processors available from IBM Corporation, the invalidation of TLB entries is the responsibility of software and is accomplished through the execution of an explicit TLB invalidate entry instruction (e.g., TLBIE in the POWER™ instruction set architecture (ISA)).

In MP computer systems, the invalidation of a PTE cached in the TLB of one processor core is complicated by the fact that each other processor core has its own respective TLB, which may also cache a copy of the target PTE. In order to maintain a consistent view of system memory across all the processor cores, the invalidation of a PTE in one processor core requires the invalidation of the same PTE, if present, within the TLBs of all other processor cores.

In many conventional MP computer systems, the invalidation of a PTE in all processor cores in the system is accomplished by the execution of a TLB invalidate entry instruction within an initiating processor core and the broadcast of a TLB invalidate entry request from the initiating processor core to each other processor core in the system. The TLB invalidate entry instruction (or instructions, if multiple PTEs are to be invalidated) may be followed in the instruction sequence of the initiating processor core by one or more synchronization instructions that guarantee that the TLB entry invalidation has been performed by all processor cores.

In conventional MP computer systems, the TLB invalidate entry instruction and associated synchronization instructions are strictly serialized, meaning that the hardware thread of the initiating processor core that includes the TLB invalidate entry instruction must complete processing each instruction (e.g., by broadcasting the TLB invalidate entry request to other processor cores) before execution proceeds to the next instruction of the hardware thread. As a result of this serialization, at least the hardware thread of the initiating processor core that includes the TLB entry invalidation instruction incurs a large performance penalty, particularly if the hardware thread includes multiple TLB invalidate entry instructions.

In multithreaded processing units, it is often the case that at least some of the queues, buffers, and other storage facilities of the processing unit are shared by multiple hardware threads. The strict serialization of the TLBIE invalidate entry instruction and associated synchronization instructions can cause certain of the requests associated with the TLB invalidation sequence to stall in these shared facilities, for example, while awaiting confirmation of the processing of the requests by other processor cores. If not handled appropriately, such stalls can cause other hardware threads sharing the storage facilities to experience high latency and/or to deadlock.

In view of the foregoing, the present invention recognizes that it would be useful and desirable to provide an improved method for maintaining coherency of PTEs in a multi-threaded computer system.

BRIEF SUMMARY

According to one embodiment, a data processing system includes a processing unit including a processor core and a lower-level cache. An arbiter in the lower-level cache gathers translation invalidation requests assigned to state machines in the lower-level cache into a set for joint handling in the processor core. The gathering includes selection of one of the set of gathered translation invalidation requests as an end-of-sequence (EOS) request. The arbiter issues to the processor core a sequence of the gathered translation invalidation requests terminating with the EOS request. Based on receipt of each of the gathered requests, the processor core invalidates any translation entries providing translation for the addresses specified by the translation invalidation requests and marks memory-referent requests dependent on the invalidated translation entries. Based on receipt of the EOS request and in response to all of the marked memory-referent requests draining from the processor core, the processor core issues a completion request to the lower-level cache indicating completion of servicing by the processor core of the set of gathered translation invalidation requests.

DETAILED DESCRIPTION

Figure 1:
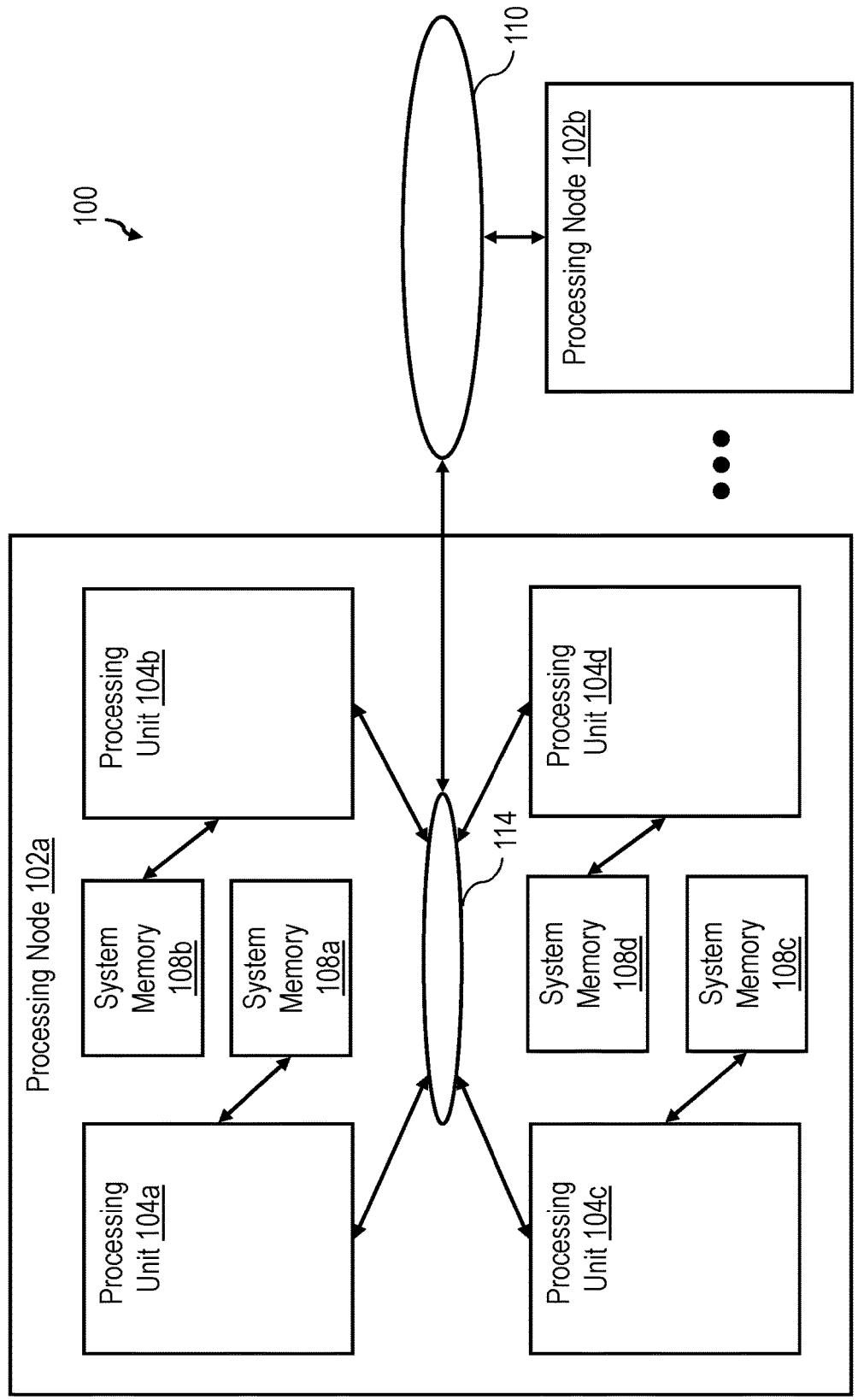
FIG. 1 is a high-level block diagram of an exemplary data processing system in accordance with one embodiment.

With reference now to the figures, wherein like reference numerals refer to like and corresponding parts throughout, and in particular with reference to FIG. 1, there is illustrated a high-level block diagram depicting an exemplary data processing system 100 in accordance with one embodiment. In the depicted embodiment, data processing system 100 is a cache-coherent symmetric multiprocessor (SMP) data processing system including multiple processing nodes 102 for processing data and instructions. Processing nodes 102 are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104 within each processing node 102 are coupled for communication to each other and system interconnect 110 by a local interconnect 114, which, like system interconnect 110, may be implemented, for example, with one or more buses and/or switches. System interconnect 110 and local interconnects 114 together form a system fabric.

As described below in greater detail with reference to FIG. 2, processing units 104 each include a memory controller 106 coupled to local interconnect 114 to provide an interface to a respective system memory 108. Data and instructions residing in system memories 108 can generally be accessed, cached, and modified by a processor core in any processing unit 104 of any processing node 102 within data processing system 100. System memories 108 thus form the lowest level of memory storage in the distributed shared memory system of data processing system 100. In alternative embodiments, one or more memory controllers 106 (and system memories 108) can be coupled to system interconnect 110 rather than a local interconnect 114.

Those skilled in the art will appreciate that SMP data processing system 100 of FIG. 1 can include many additional non-illustrated components, such as interconnect bridges, non-volatile storage, ports for connection to networks or attached devices, etc. Because such additional components are not necessary for an understanding of the described embodiments, they are not illustrated in FIG. 1 or discussed further herein. It should also be understood, however, that the enhancements described herein are applicable to data processing systems of diverse architectures and are in no way limited to the generalized data processing system architecture illustrated in FIG. 1.

Figure 2:
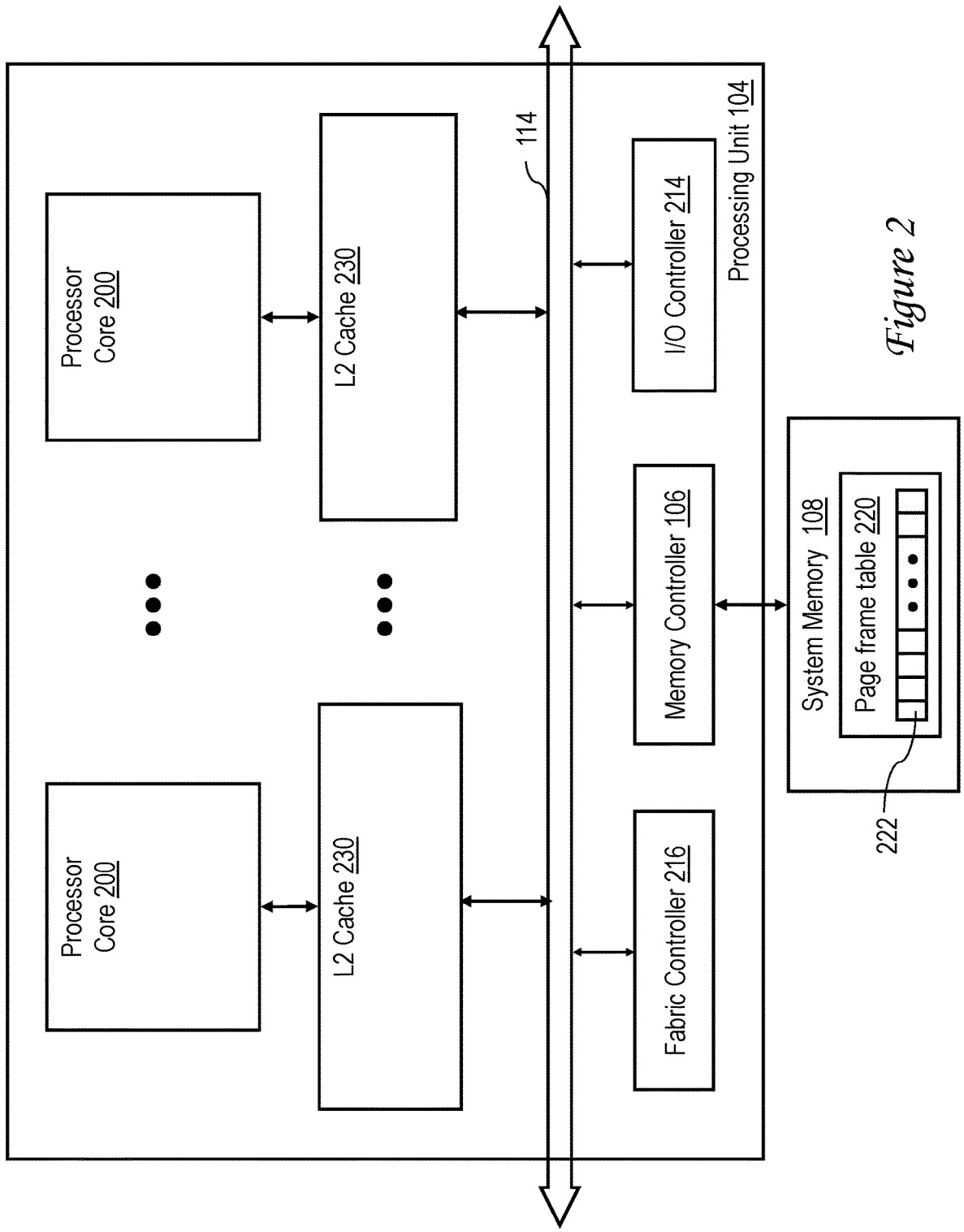
FIG. 2 is a more detailed block diagram of an exemplary processing unit in accordance with one embodiment.

Referring now to FIG. 2, there is depicted a more detailed block diagram of an exemplary processing unit 104 in accordance with one embodiment. In the depicted embodiment, each processing unit 104 is an integrated circuit comprising a semiconductor substrate in which integrated circuitry is fabricated, as is known in the art. The integrated circuitry includes one or more processor cores 200 for processing instructions and data. In a preferred embodiment, each processor core 200 supports simultaneous multithreading (SMT) and thus is capable of independently executing multiple hardware threads of execution simultaneously.

The operation of each processor core 200 is supported by a multi-level memory hierarchy having at its lowest level a shared system memory 108 accessed via an integrated memory controller 106. As illustrated, shared system memory 108 stores a page frame table 220 containing a plurality of page table entries (PTEs) 222 for performing effective-to-real address translation to enable access, utilizing effective addresses, to the storage locations in system memory 108. At its upper levels, the multi-level memory hierarchy includes one or more levels of cache memory, which in the illustrative embodiment include a store-through level one (L1) cache 302 (see FIG. 3) within and private to each processor core 200, and a respective store-in level two (L2) cache 230 for each processor core 200. Although the illustrated cache hierarchies includes only two levels of cache, those skilled in the art will appreciate that alternative embodiments may include additional levels (L3, L4, etc.) of on-chip or off-chip, private or shared, in-line or lookaside cache, which may be fully inclusive, partially inclusive, or non-inclusive of the contents the upper levels of cache.

Each processing unit 104 further includes an integrated and distributed fabric controller 216 responsible for controlling the flow of operations on the system fabric comprising local interconnect 114 and system interconnect 110 and for implementing the coherency communication required to implement the selected cache coherency protocol. Processing unit 104 further includes an integrated I/O (input/output) controller 214 supporting the attachment of one or more I/O devices (not depicted).

Figure 3:
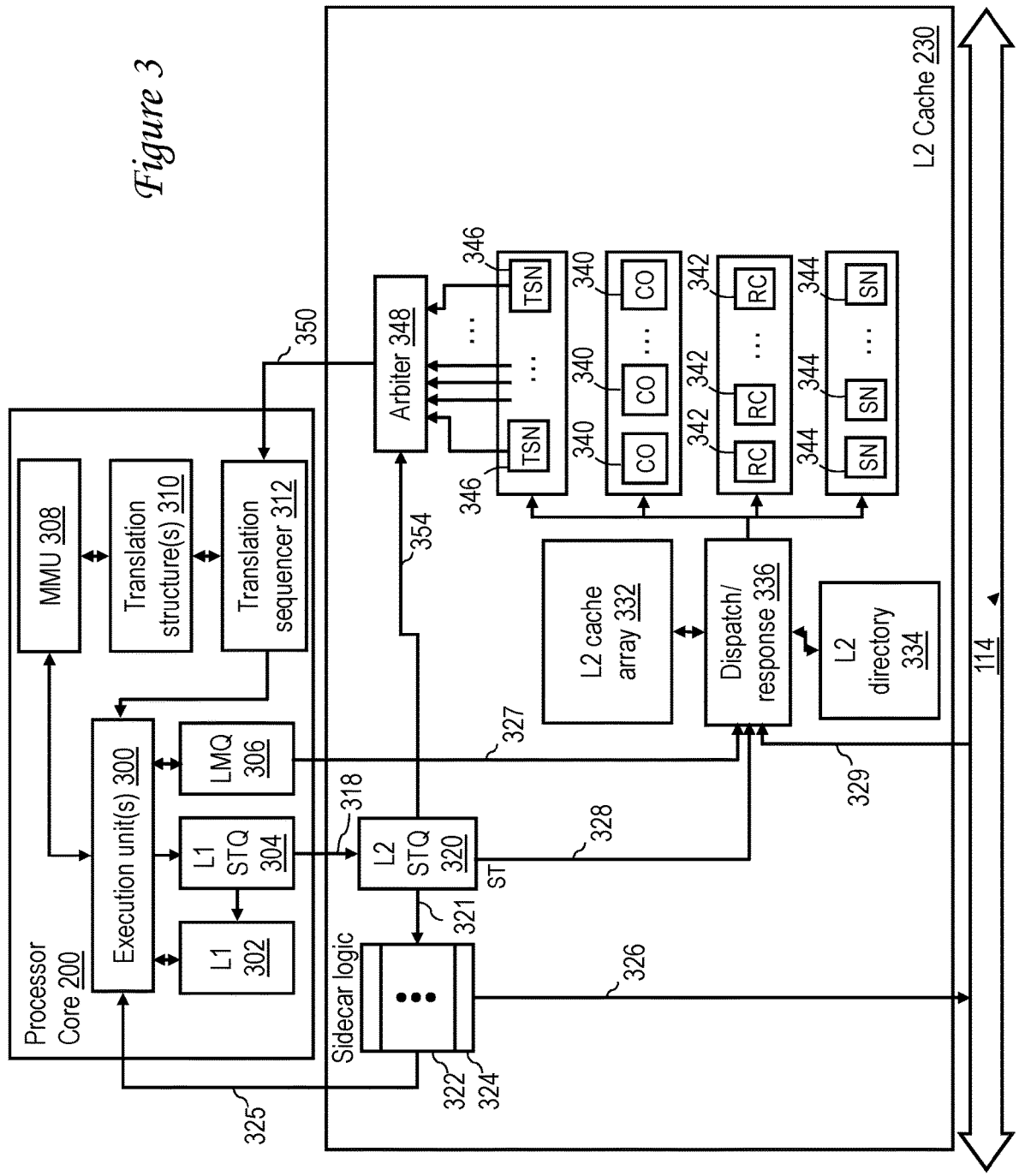
FIG. 3 is a detailed block diagram of a processor core and lower level cache memory in accordance with one embodiment.

With reference now to FIG. 3, there is illustrated a more detailed block diagram of an exemplary embodiment of a processor core 200 and its affiliated L2 cache 230.

Processor core 200 includes one or more execution unit(s) 300, which execute instructions from multiple simultaneous hardware threads of execution. The instructions can include, for example, arithmetic instructions, logical instructions, and memory-referent instructions, as well as translation entry invalidation instructions (hereinafter referred to by the POWER™ ISA mnemonic TLBIE (Translation Lookaside Buffer Invalidate Entry)) and associated synchronization instructions. Execution unit(s) 300 can generally execute instructions of a hardware thread in any order as long as data dependencies and explicit orderings mandated by synchronization instructions are observed.

Processor core 200 additionally includes a memory management unit (MMU) 308 responsible for translating target effective addresses determined by the execution of memory-referent instructions in execution unit(s) 300 into real addresses. MMU 308 performs effective-to-real address translation by reference to one or more translation structure(s) 310, such as a translation lookaside buffer (TLB), block address table (BAT), segment lookaside buffers (SLBs), etc. The number and type of these translation structures varies between implementations and architectures. If present, the TLB reduces the latency associated with effective-to-real address translation by caching PTEs 222 retrieved from page frame table 220. A translation sequencer 312 associated with translation structure(s) 310 handles invalidation of effective-to-real translation entries held within translation structure(s) 310 and manages such invalidations relative to memory-referent instructions in-flight (i.e., undergoing execution) in processor core 200.

Processor core 200 additionally includes various storage facilities shared by the multiple hardware threads supported by processor core 200. The storage facilities shared by the multiple hardware threads include an L1 store queue 304 that temporarily buffers store and synchronization requests generated by execution of corresponding store and synchronization instructions by execution unit(s) 300. Because L1 cache 302 is a store-through cache, meaning that coherence is fully determined at a lower level of cache hierarchy (e.g., at L2 cache 230), requests flow through L1 STQ 304 and then pass via bus 318 to L2 cache 230 for processing. Because such store requests have not yet been fully processed through the point of coherence at L2 cache 230, the store requests dependent on the address translation provided by a translation entry must be ordered ahead of any update to that translation entry in order to avoid corrupting the memory page translated by the translation entry.

The storage facilities of processor core 200 shared by the multiple hardware threads additionally include a load miss queue (LMQ) 306 that temporarily buffers load requests that miss in L1 cache 302. Because such load requests have not yet been satisfied, they are subject to hitting the wrong memory page if the address translation entry utilized to obtain the target real addresses of the load requests is invalidated before the load requests are satisfied. Consequently, if a PTE or other translation entry within translation structure(s) 310 is to be invalidated, any load requests in LMQ 306 that depends on that translation entry has to be drained from LMQ 306 and has to be satisfied before the effective address translated by the relevant translation entry can be reassigned.

Still referring to FIG. 3, L2 cache 230 includes an L2 cache array 332 and a L2 directory 334 of the contents of L2 cache array 332. Assuming L2 cache array 332 and L2 directory 334 are set-associative as is conventional, storage locations in system memories 108 are mapped to particular congruence classes within cache array 332 utilizing predetermined index bits within the system memory (real) addresses. The particular memory blocks stored within the cache lines of cache array 332 are recorded in L2 directory 334, which contains one directory entry for each cache line. While not expressly depicted in FIG. 3, it will be understood by those skilled in the art that each directory entry in cache directory 334 includes various fields, for example, a tag field that identifies the real address of the memory block held in the corresponding cache line of cache array 332, a state field that indicates the coherency state of the cache line, an LRU (Least Recently Used) field indicating a replacement order for the cache line with respect to other cache lines in the same congruence class, and inclusivity bits indicating whether the memory block may be held in the associated L1 cache 302.

L2 cache 230 additionally includes an L2 STQ 320 that receives storage-modifying requests and synchronization requests from L1 STQ 304 via interface 318 and buffers such requests. It should be noted that L2 STQ 320 is a unified store queue that buffers requests for all hardware threads of the affiliated processor core 200. Consequently, all of the threads' store requests, TLBIE requests and associated synchronization requests flow through L2 STQ 320. Although in most embodiments L2 STQ 320 includes multiple entries, L2 STQ 320 is required to function in a deadlock-free manner regardless of depth (i.e., even if implemented as a single entry queue). To this end, L2 STQ 320 is coupled by an interface 321 to associated sidecar logic 322, which includes one request-buffering entry 324 (each such entry referred to herein as a "sidecar") per hardware thread supported by the affiliated processor core 200. As such, the number of sidecars 324 is unrelated to the number of entries in L2 STQ 320. As described further herein, use of sidecars 324 allows potentially deadlocking requests to be removed from L2 STQ 320 so that no deadlocks occur during invalidation of a translation entry.

L2 cache 230 further includes dispatch/response logic 336 that receives local load and store requests initiated by the affiliated processor core 200 via buses 327 and 328, respectively, and remote requests of other processing units 104 snooped on local interconnect 114 via bus 329. Such requests, including local and remote load requests, store requests, TLBIE requests, and associated synchronization requests, are processed by dispatch/response logic 336 and then dispatched, if possible, to the appropriate state machines within L2 cache 230 for servicing.

In the illustrated embodiment, the state machines implemented within L2 cache 230 to service requests include multiple Read-Claim (RC) machines 342, which independently and concurrently service load (LD) and store (ST) requests received from the affiliated processor core 200. In order to service remote memory access requests originating from processor cores 200 other than the affiliated processor core 200, L2 cache 230 also includes multiple snoop (SN) machines 344. Each snoop machine 344 can independently and concurrently handle a remote memory access request snooped from local interconnect 114. As will be appreciated, the servicing of memory access requests by RC machines 342 may require the replacement or invalidation of memory blocks within cache array 332 (and L1 cache 302). Accordingly, L2 cache 230 also includes CO (castout) machines 340 that manage the removal and writeback of memory blocks from cache array 332.

In the depicted embodiment, L2 cache 230 additionally includes multiple translation snoop (TSN) machines 346, which are utilized to service TLBIE requests and associated synchronization requests. It should be appreciated that in some embodiments, TSN machines 346 can be implemented in another sub-unit of a processing unit 104, for example, a non-cacheable unit (NCU) (not illustrated) that handles non-cacheable memory access operations. In at least one embodiment, the same number of TSN machines 346 is implemented at each L2 cache 230 in order to simplify implementation of a consensus protocol (as discussed further herein) that coordinates processing of multiple concurrent TLBIE requests within data processing system 100.

TSN machines 346 are all coupled to an arbiter 348, which selects requests being handled by TSN machines 346 for transmission to translation sequencer 312 in processor core 200 via bus 350. In at least some embodiments, bus 350 is implemented as a unified bus that transmits not only requests of TSN machines 346, but also returns data from the L2 cache 230 to processor core 200, as well as other operations. It should be noted that translation sequencer 312 preferably accepts requests from arbiter 348 via bus 350 in a non-blocking fashion in order to avoid deadlock. Arbiter 348 receives notification of completion of processing of TLBIE requests (i.e., a TLBCMPLT_Ack signal (see, e.g., FIG. 11, block 1106)) by processor core 200 from L2 STQ 320 via signal line 354.

Figure 4:
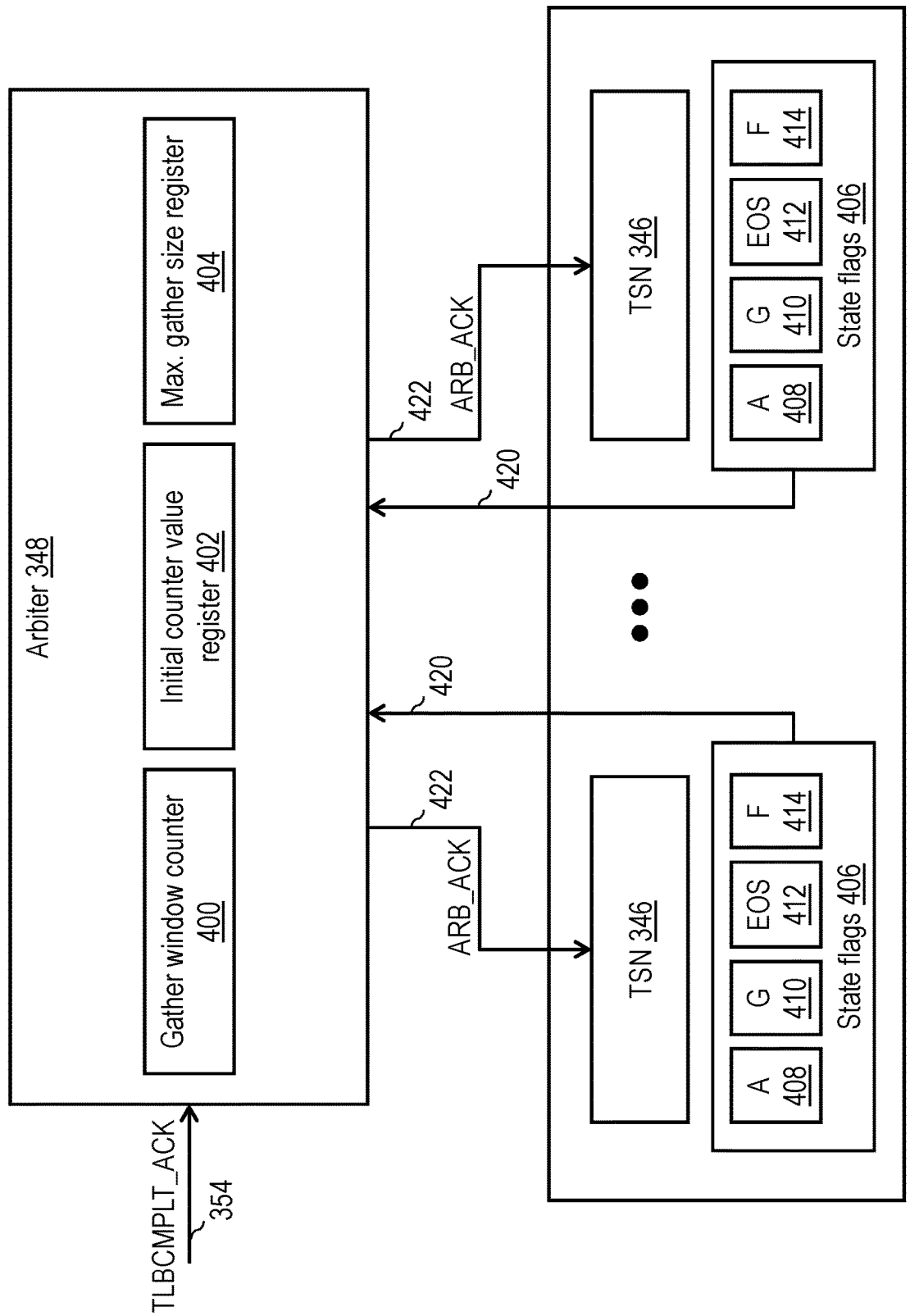
FIG. 4 is a more detailed block diagram of the arbiter and translation snoopers of FIG. 3 in accordance with one embodiment.

Referring now to FIG. 4, there is depicted a more detailed block diagram of the arbiter 348 and translation snoopers 346 of FIG. 3 in accordance with one embodiment. In the illustrated embodiment, arbiter 348 includes a gather window counter 400 utilized by arbiter 348 to control a continuous time period (a "gather window") in which a sequence of one or more TLBIE requests can be gathered for processing as a group by the associated processor core 200. In operation, arbiter 348 loads gather window counter 400 with the initial counter value stored in initial counter value register 402 and iteratively decrements the count value of gather window counter 400 at regular time intervals to a value of zero, which represents the end of a particular gather window. Of course, those skilled in the art will recognize that a decrementing counter is but one of many possible techniques for measuring the duration of a gather window and that in other embodiments other techniques can be employed. In at least some embodiments, arbiter 348 can additionally restrict the number of TLBIE requests that can be gathered for joint processing by implementing a maximum gather size register 404 specifying a maximum number of TLBIE requests that can be gathered for joint processing by the associated processor core 200.

FIG. 4 further illustrates that each TSN machine 346 has a respective associated set of state flags 406 visible to arbiter 348. In the depicted example, state flags 406 include an active flag 408 that is set to indicate the associated TSN machine 346 is active processing a TLBIE request and that is reset otherwise. State flags 406 additionally include a gathered (G) flag 410, which is set to indicate whether or not the TLBIE request being processed by the TSN machine 346 has been gathered into a sequence of zero or more additional TLBIE requests being processed by other TSN(s) 346 of the same L2 cache 230 and which is reset otherwise. State flags 406 further include an end-of-sequence (EOS) flag 412, which indicates whether or not the TLBIE request being processed by the TSN machine 346 is the final TLBIE request in a sequence of one or more TLBIE requests gathered by L2 cache 230 for joint processing by the associated processor core 200 and which is reset otherwise. Finally, state flags 406 include a finished (F) flag 414 that is set to indicate the TLBIE request being processed by the TSN machine 346 has been sent to the associated processor core 200 for processing and that is reset otherwise.

Figures 5, 6:
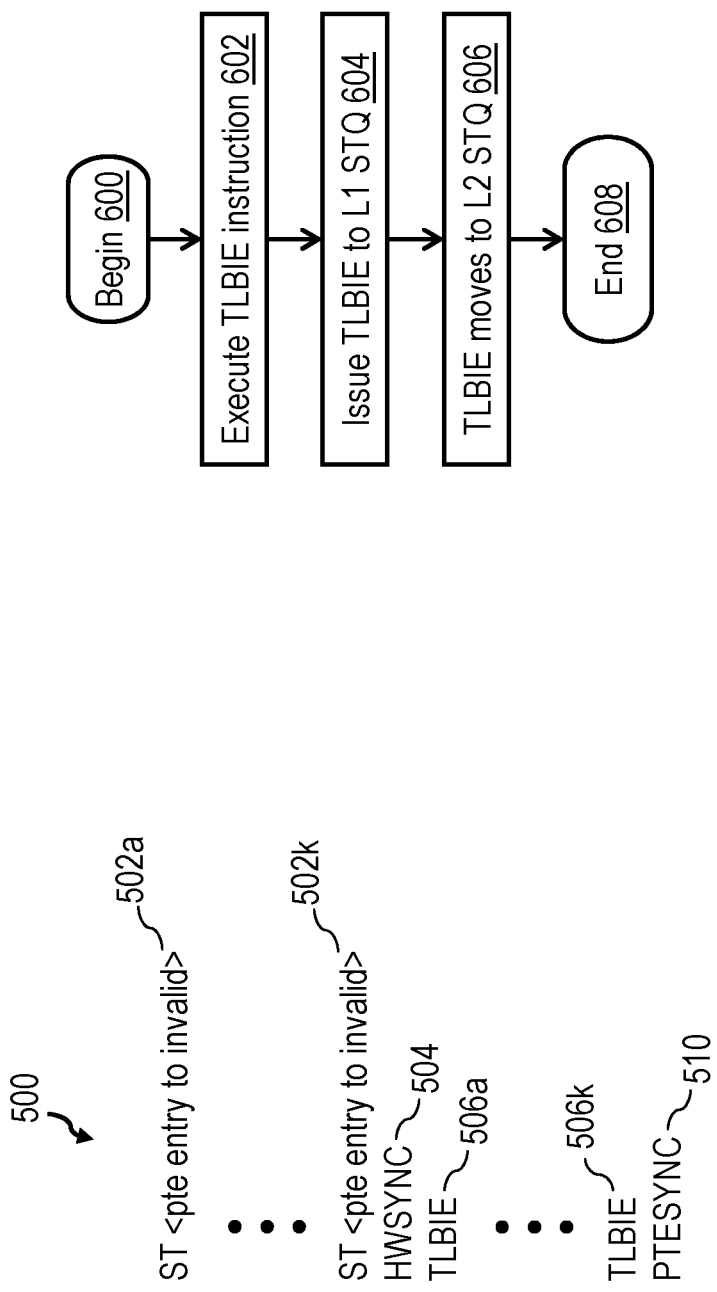
FIG. 5 is an exemplary translation entry invalidation instruction sequence in accordance with one embodiment.
FIG. 6 is a high-level logical flowchart of an exemplary method by which a processor core of a multiprocessor data processing system processes a translation entry invalidation instruction in accordance with one embodiment.

With reference now to FIG. 5, there is illustrated an exemplary translation entry invalidation instruction sequence 500 that may be executed by a processor core 200 of data processing system 100 in accordance with one embodiment. The purpose of instruction sequence 500 is to: (a) disable one or more translation entries (e.g., PTEs 222) in page frame table 220 so that the translation entry or entries does not get reloaded by any MMU 308 of data processing system 100, (b) invalidate any copy or copies of the translation entry or entries (or any other translation entry that translates the same effective address as one of the translation entries) cached by any processor core 200 in data processing system 100, and (c) drain all the outstanding memory access requests that depend on the old translation entry or entries before the effective address(es) is/are re-assigned. If a translation were updated before the store requests that depend on the old translation entry drain, the store requests may corrupt the memory page identified by old translation entry. Similarly, if load requests that depend on an old translation entry and that miss L1 cache 302 were not satisfied before the translation is reassigned, the load requests would read data from a different memory page than intended and thus observe data not intended to be visible to the load requests.

Instruction sequence 500, which may be preceded and followed by any arbitrary number of instructions, begins with one or more store (ST) instructions 502a-502k, referred to generally as store instruction(s) 502. Each store instruction 502, when executed, causes a store request to be generated that causes a target PTE 222 in page frame table 220 to be marked invalid. Once the store request has caused the PTE 222 to be marked invalid in page frame table 220, MMUs 308 will no longer load the invalidated translation from page frame table 220.

Following the one or more store instructions 502 in instruction sequence 500 is a heavy weight synchronization (i.e., HWSYNC) instruction 504, which is a memory barrier that ensures that the following TLBIE instruction(s) 506a-506k (referred to generally as TLBIE instructions 506) do not get reordered by processor core 200 such that any of TLBIE instruction(s) 506 executes in advance of any of store instruction(s) 502. Thus, HWSYNC instruction 504 ensures that if a processor core 200 reloads a PTE 222 from page frame table 220 after a TLBIE instruction 506 invalidates cached copies of the PTE 222, the processor core 200 is guaranteed to have observed the invalidation due to a store instruction 502 and therefore will not use or re-load the target PTE 222 into translation structure(s) 310 until the effective address translated by the target PTE 222 is reassigned and set to valid.

Following HWSYNC instruction 504 in instruction sequence 500 are one or more TLBIE instructions 506a-506k, each of which, when executed, generates a corresponding TLBIE request that invalidates any translation entries translating the target effective address of the TLBIE request in all translation structures 310 throughout data processing system 100. The TLBIE instruction(s) 506a-506k are followed in instruction sequence 500 by a PTESYNC instruction 510, which ensures that, prior to execution of the thread proceeding to succeeding memory-referent instructions, the TLBIE request(s) generated by execution of TLBIE instruction(s) 506 have finished invalidating all translations of the target effective address in all translation structures 310 throughout data processing system 100 and all prior memory access requests depending on the now-invalidated translation have drained. Execution of PTESYNC instruction 510 generates a PTESYNC request that is broadcast to all processing units 104 of data processing system 100 to both ensure systemwide completion of the TLBIE request(s) generated by TLBIE instruction(s) 506 and to enforce instruction ordering of TLBIE instructions(s) 506 with respect to younger memory-referent instructions.

To promote understanding of the inventions disclosed herein, the processing of instruction sequence 500 in exemplary embodiment is now described with reference to FIGS. 6-14.

Referring first to FIG. 6, there is depicted a high-level logical flowchart of an exemplary method by which an initiating processor core 200 of a multiprocessor data processing system 100 processes a translation entry invalidation (e.g., TLBIE) instruction in accordance with one embodiment. The illustrated process represents the processing performed in a single hardware thread, meaning that multiple of these processes can be performed concurrently (i.e., in parallel) on a single processor core 200, and further, that multiple of these processes can be performed concurrently on various different processing cores 200 throughout data processing system 100. As a result, multiple different address translation entries buffered in the various processor cores 200 of data processing system 100 can be invalidated by different initiating hardware threads in a concurrent manner.

The illustrated process begins at block 600 and then proceeds to block 602, which illustrates execution of a TLBIE instruction 506 in an instruction sequence 500 by execution unit(s) 300 of a processor core 200. Execution of TLBIE instruction 506 determines a target effective address for which all translation entries buffered in translation structure(s) 310 throughout data processing system 100 are to be invalidated. Importantly, in response to execution of TLBIE instruction 506, processor core 200 does not pause the dispatch of instructions in the initiating hardware thread, meaning that TLBIE instructions 506a-506k in instruction sequence 500 can be executed without delay or interruption.

At block 604, a TLBIE request corresponding to TLBIE instruction 506 is generated and issued to L1 STQ 304. The TLBIE request may include, for example, a transaction type indicating the type of the request (i.e., TLBIE), the effective address for which cached translations are to be invalidated, and an indication of the initiating processor core 200 and hardware thread that issued the TLBIE request. Processing of store requests, TLBIE requests and other requests buffered in L1 STQ 304 progresses, and the TLBIE request eventually moves from L1 STQ 304 to L2 STQ 320 via bus 318 as indicated at block 606. Thereafter, the process of FIG. 6 ends at block 608.

Figure 7:
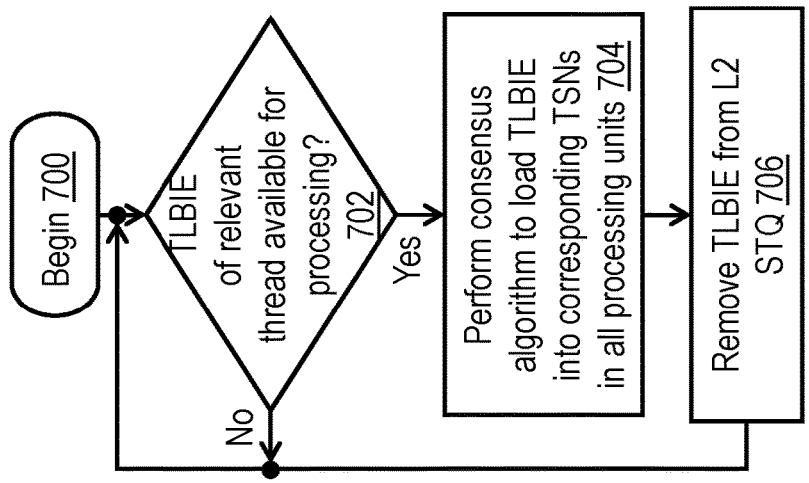
FIG. 7 is a high-level logical flowchart of an exemplary method by which a snooper of a processing unit handles translation entry invalidation requests and translation synchronization requests in accordance with one embodiment.

With reference now to FIG. 7, there is illustrated a high-level logical flowchart of an exemplary method by which an L2 STQ 320 of an L2 cache 230 processes translation entry invalidation (e.g., TLBIE) requests of a hardware thread of the affiliated processor core 200 in accordance with one embodiment. The process of FIG. 7 is performed on a per-thread basis. As such, multiple instances of the process of FIG. 7 may be performed in parallel by an L2 cache 230.

The process of FIG. 7 begins at block 700 and then proceeds to block 702. Block 702 illustrates L2 STQ 320 determining whether or not a TLBIE request of the relevant hardware thread of the affiliated processor core 200 has been loaded into L2 STQ 320, as described above with reference to block 606 of FIG. 6. If not, the process iterates at block 702. However, in response to a determination at block 702 that a TLBIE request of the relevant hardware thread of the affiliated processor core 200 has been loaded into L2 STQ 320, L2 STQ 320 participates in a consensus protocol (which may be conventional) via local interconnect 114 to ensure that one (and only one) TSN machine 346 in each and every L2 cache 230 receives its TLBIE request (block 704). In addition, the consensus protocol ensures that the various TSN machines 346 only take action to service the TLBIE request once all of the corresponding TSN machines 346 have received the TLBIE request. Thereafter, L2 STQ 320 removes that TLBIE request from its entry within L2 STQ 320 (block 706), and the process returns to block 702, which has been described.

Figure 8:
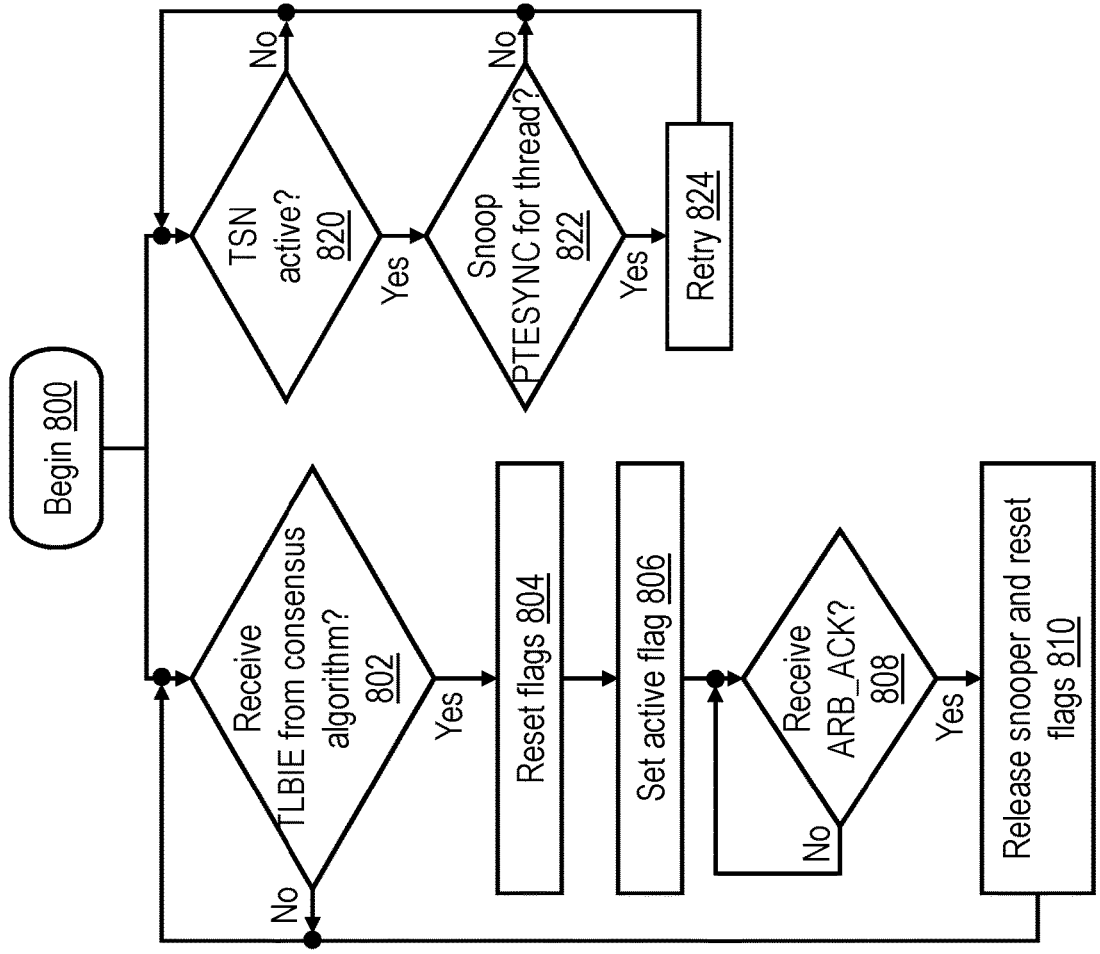
FIG. 8 is a high-level logical flowchart of an exemplary method by which a store queue of a processing unit processes translation invalidation requests, translation synchronization requests, and page table synchronization requests in accordance with one embodiment.

Referring now to FIG. 8, there is depicted a high-level logical flowchart of an exemplary method by which TSN machines 346 processes TLBIE requests (blocks 802-810) and PTESYNC requests (blocks 820-824) in accordance with one embodiment. The illustrated process is independently and concurrently performed for each TSN machine 346, which can process at most one request at any given time.

The process begins at block 800 and then proceeds in parallel to blocks 802 and 820. Block 802 illustrates a TSN machine 346 monitoring for receipt of a TLBIE request via the consensus protocol. The TLBIE request, which is broadcast over the system fabric 110, 114 to the L2 cache 230 of the initiating processor core 200 and those of all other processor cores 200 of data processing system 100 at block 704 of FIG. 7, is received by an L2 cache 230 via interface 329, processed by dispatch/response logic 336, and then assigned to the TSN machine 346. As noted above, in a preferred embodiment, the consensus protocol enforces the condition that the TLBIE request is allocated a TSN machine 346 in one L2 cache 230 only if a TSN machine 346 is similarly allocated to the TLBIE request by all other L2 caches 230. At block 804, the TSN machine 346 resets all of its state flags 406. In addition, at block 806, TSN machine 346 sets its active flag 408 to indicate an active state, which is sensed by the associated arbiter 348 via signal line 420. The TSN machine 346 assuming the active state informs the associated arbiter 348 that a TLBIE request is ready to be processed, as described further below with reference to FIGS. 9A-9C.

Following block 806, the process proceeds to block 808, which illustrates that the TSN machine 346 assigned to handle the TLBIE request monitoring for receipt of an ARB_ACK signal from arbiter 348 via signal line 422, as discussed below with reference block 936 of FIG. 9B. The ARB_ACK signal indicates that the TLBIE request has been forwarded by arbiter 348 to the associated processor core 200 and has been processed by the associated processor core 200 (i.e., by invalidating the relevant translation entries in translation structure(s) 310 and by draining relevant memory referent requests from processor core 200). In response to receipt of the ARB_ACK signal, the TSN machine 346 resets its state flags 406, and the TSN machine 346 is released for reallocation to a subsequent TLBIE request (block 810). Thereafter, the process of FIG. 8 returns from block 810 to block 802, which has been described.

Referring now to blocks 820-824, a TSN machine 346 determines by reference to its active flag 408 whether or not it is in the active state established at block 806 (block 820). If not, the process continues to iterate at block 820. If, however, the TSN machine 346 determines at block 820 that it is in the active state, TSN machine 346 additionally determines at block 822 if it has snooped a PTESYNC request for the given hardware thread for which it is handling a TLBIE request. Generation of a PTESYNC request by execution of a corresponding PTESYNC instruction is described below with reference to FIG. 12. If the TSN machine 346 determines at block 822 that no PTESYNC request for the relevant hardware thread has been snooped, the process returns to block 820. However, in response to a determination that a PTESYNC request of the initiating hardware thread of its TLBIE request has been snooped, TSN machine 346 provides a Retry coherence response to the PTESYNC request via the system fabric 110, 114, as indicated at block 824. As discussed below with reference to blocks 1306-1308 of FIG. 13, a Retry coherence response by any TSN snooper 346 handling a TLBIE request for the initiating hardware thread forces the PTESYNC request to be reissued by the source L2 cache 230 and prevents the initiating hardware thread from progressing until the PTESYNC request completes without a Retry coherence response. The PTESYNC request completes without a Retry coherence response when all processor cores 200 (other than the initiating processor core 200) have completed their processing of any outstanding TLBIE requests from the thread issuing the PTESYNC request. It should be noted in this regard that PTESYNC requests are not and need not be self-snooped by the initiating L2 cache 230.

Figure 9A:
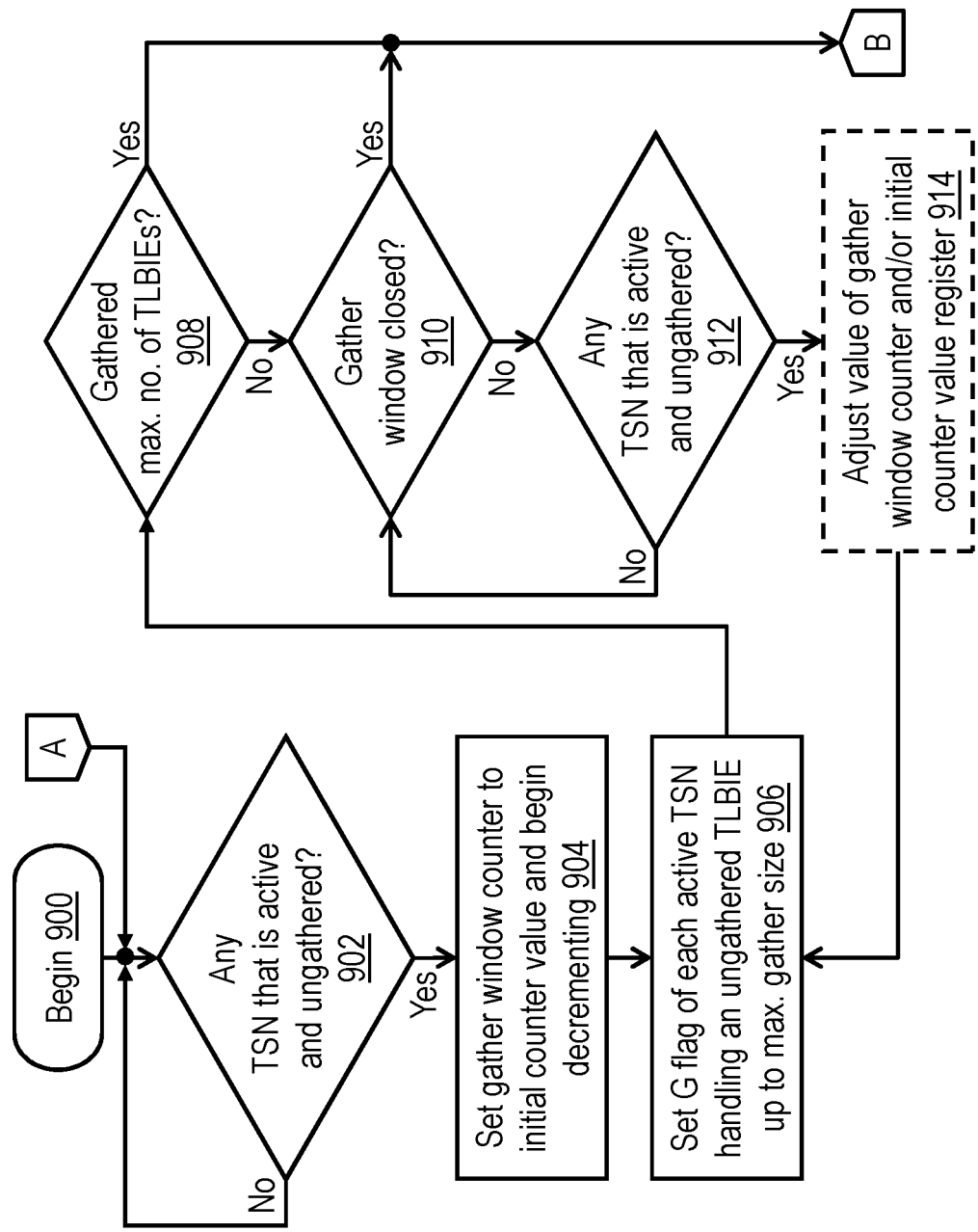
FIG. 9A-9C together form a high-level logical flowchart of an exemplary method by which an arbiter of a processing unit gathers a sequence of translation entry invalidation requests for processing by the associated processor core in accordance with one embodiment.
Figure 9B:
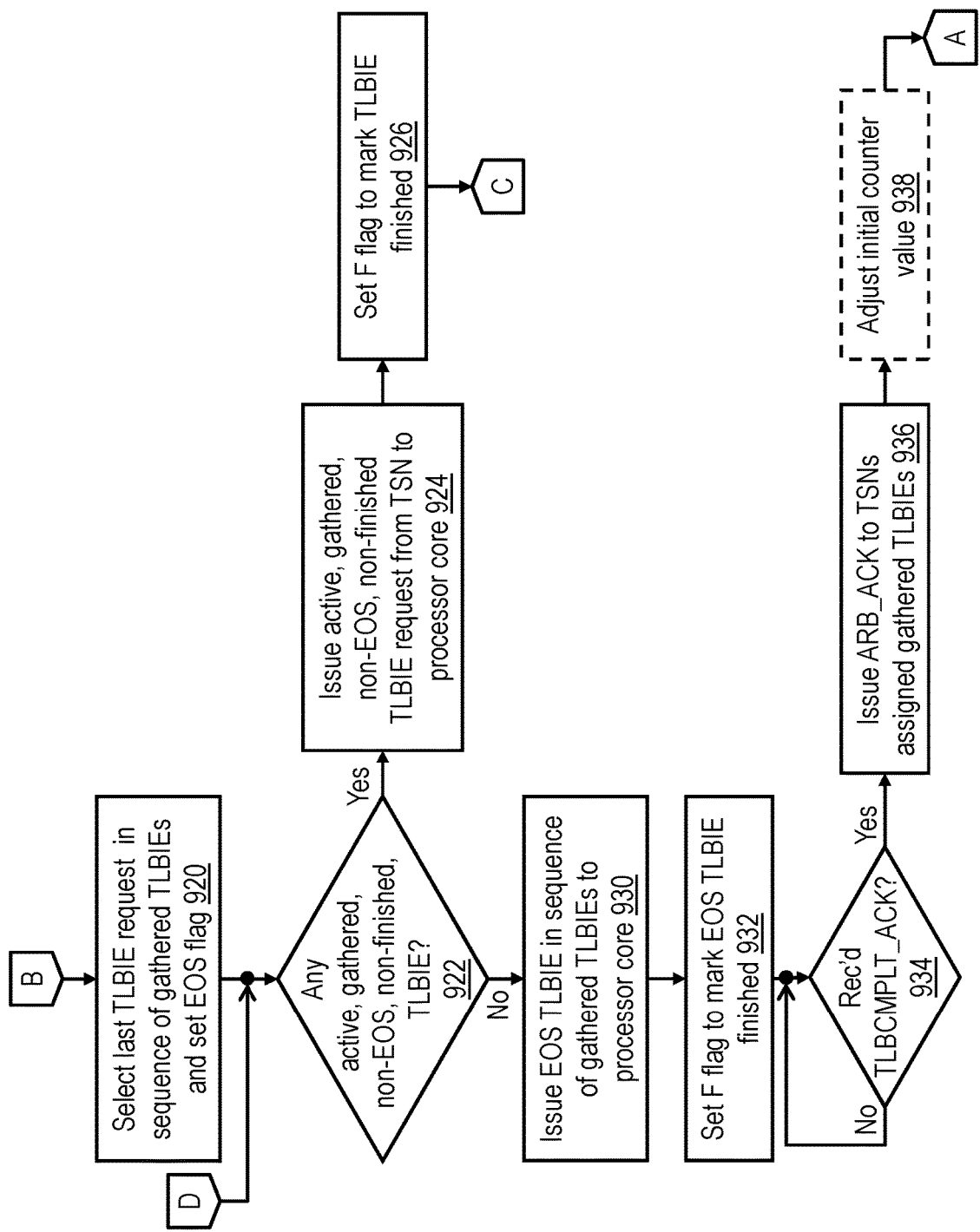
Figure 9C:
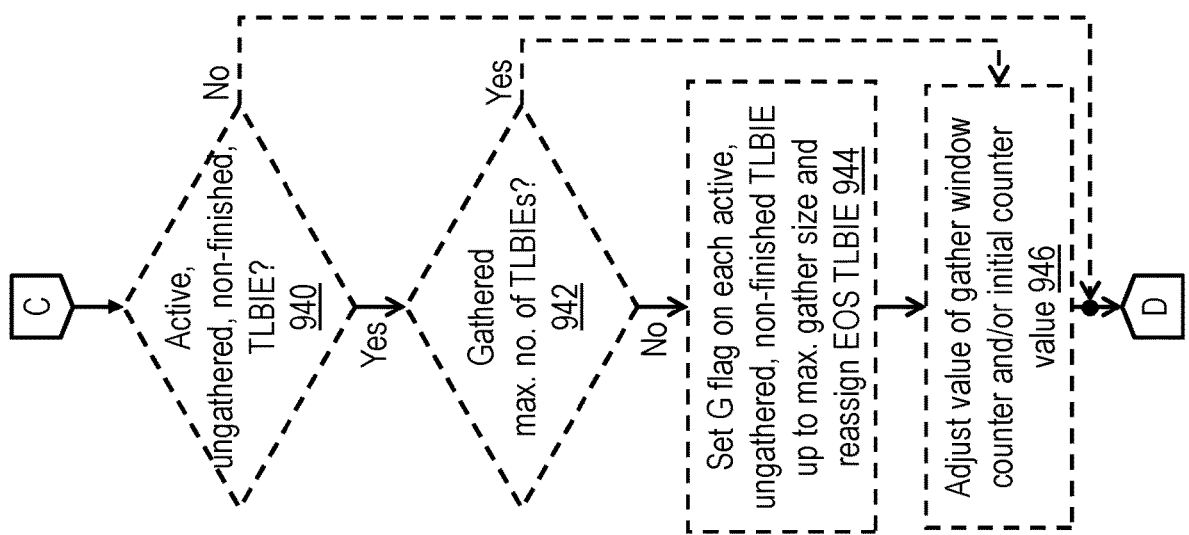

Referring now to FIGS. 9A-9C, there is illustrated a high-level logical flowchart of an exemplary method by which an arbiter 348 of the L2 cache 230 gathers a sequence of one or more TLBIE requests of TSN machines 346 for joint processing by the associated processor core 200 in accordance with one embodiment. The process begins at block 900 of FIG. 9A and then proceeds to block 902, which illustrates arbiter 348 determining whether or not the state flags 406 of any of its TSN machines 346 indicate the active state and ungathered state (i.e., active flag 408 is set and gathered flag 410 is reset). If not, the process of FIG. 9A iterates at block 902. However, in response to an affirmative determination at block 902, arbiter 348 sets gather window counter 400 to the initial counter value specified in initial counter value register 402 and begins periodically decrementing gather window counter 400 (block 904). In addition, arbiter 348 sets the gathered flag 410 on each active TSN machine 346 handling an ungathered TLBIE request up to the maximum gather size specified in maximum gather size register 404 (block 906).

Arbiter 348 determines at block 908 whether or not the number of gathered TLBIE requests is equal to the maximum gather size. If so, the process passes through page connector B to FIG. 9B. If arbiter 348 determined at block 908 that the current number of gathered TLBIE requests is less than the maximum gather size, arbiter 348 further determines at block 910 whether or not the gather window tracked by gather window counter 400 is closed (e.g., gather window counter 400 has a count value of zero). If so, the process passes through page connector B to FIG. 9B. As indicated by block 912, while the gather window remains open, arbiter 348 continues monitoring state flags 406 for one or more TSN machines 346 in the active, ungathered state (i.e., TSN machine(s) 346 for which active flag 408 is set and gathered flag 410 is reset). In response to detection of one or more TSN machines 346 in the active, ungathered state (e.g., due to allocation of the TSN machine(s) 346 to handle additional TLBIE requests), arbiter 348 optionally adjusts the value of gather window counter 400 and/or initial counter value register 402 (block 914). For example, arbiter 348 may optionally adjust the value in gather window counter 400 or initial counter value register 402 to extend the duration of current and/or subsequent gather windows if less than a first threshold number of TLBIE requests have been available for gathering in the current gather window. Alternatively, arbiter 348 may optionally adjust the value in gather window counter 400 or initial counter value register 402 to reduce the duration of the current and/or subsequent gather windows if greater than a second threshold number of TLBIE requests have been available for gathering in the current gather window. Following block 914, the process of FIG. 9A returns to block 906 and following blocks, which have been described.

With reference now to FIG. 9B, the process begins at page connector B and then proceeds to block 920. Block 920 depicts arbiter 348 selecting the gathered TLBIE request that was received latest in time as the end-of-sequence (EOS) TLBIE request that terminates the sequence of gathered TLBIE request(s) and marking this EOS TLBIE request by setting the EOS flag 412 of the TSN machine 346 assigned to handle the EOS TLBIE request. At block 922, arbiter 348 determines whether or not any active, gathered, non-EOS, non-finished TLBIE request is available for issuance to the processor core 200 by reference to of state flags 406 of TSN machines 346. If not, the process proceeds to block 930 and following blocks, which are described below. If, however, arbiter 348 determines that at least one active, gathered, non-EOS, non-finished TLBIE request is available for issuance to the processor core 200, arbiter 348 selects and issues one of the TLBIE requests identified at block 922 to the associated processor core 200 for processing (block 924). Arbiter 348 additionally sets the finished flag 414 of the relevant TSN machine 346 to indicate that the TLBIE request has been issued to processor core 200 (block 926). Thereafter, the process passes through page connector C to FIG. 9C, which is described below.

Referring now to block 930, if arbiter 348 determines that no active, gathered, non-EOS, non-finished TLBIE request is available for issuance to the processor core 200, arbiter 348 issues a distinctive EOS TLBIE request to the associated processor core 200 for processing (block 930) and sets the finished flag 414 of the relevant TSN machine 346 to indicate that the TLBIE request has been issued to processor core 200 (block 932). The EOS TLBIE request issued at block 930 can be distinguished from the non-EOS TLBIE request issued at block 924, for example, by the setting of a bit field in the EOS TLBIE request. At block 934, arbiter 348 monitors for receipt, via signal line 354, of a TLBCMPLT_ACK signal (issued at block 1106 of FIG. 11) indicating completion of the invalidation of all translation entries in translation structure(s) 310 required by the sequence of gathered TLBIE requests terminated by the EOS TLBIE request issued to the processor core 200 at block 930. In response to receipt of the TLBCMPLT_ACK, arbiter 348 issues an ARB_ACK signal via the relevant signal lines 422 to each TSN machine 346 having its gathered flag 410 set (block 936). As noted above at blocks 808-810 of FIG. 8, the ARB_ACK signal causes a recipient TSN machine 346 to be released for reassignment to a new TLBIE request. Arbiter 348 may optionally additionally adjust the initial counter value in initial counter value register 402 based, for example, on the number and frequency of receipt of TLBIE requests (block 938). Thereafter, the process returns through page connector A to block 902 of FIG. 9A, which has been described.

Referring now to FIG. 9C, the process proceeds from page connector C to optional blocks 940-946. Block 940 illustrates arbiter 348 determining by reference to state flags 406 whether or not any active, ungathered, non-finished TLBIE request(s) has been assigned to TSN(s) 346 after at least one TLBIE request in a sequence of gathered TLBIE requests has been issued to the processor core 200. In response to a negative determination at block 940, the process passes to page connector D. In response to an affirmative determination at block 940, arbiter 348 additionally determines at block 942 whether or not it has gathered the maximum number of TLBIE requests specified by maximum gather size register 404. If so, the process passes to block 946, which is described below. If, however, fewer than the maximum number of TLBIE requests have been gathered, arbiter 348 sets the gathered flag 410 on each TSN machine 346 handling an active, ungathered TLBIE request up to the maximum gather size specified in maximum gather size register 404 (block 944). In addition, at block 944, arbiter 348 reassigns the EOS TLBIE request by resetting the currently set EOS flag 412 and sets the EOS flag 412 of the most recent of the gathered TLBIE requests. Arbiter 348 then optionally adjusts the value of gather window counter 400 and/or initial counter value register 402 to increase or decrease the possibility of further gathering (block 946). Following block 946, the process returns to block 922 of FIG. 9B through page connector D.

Figure 10:
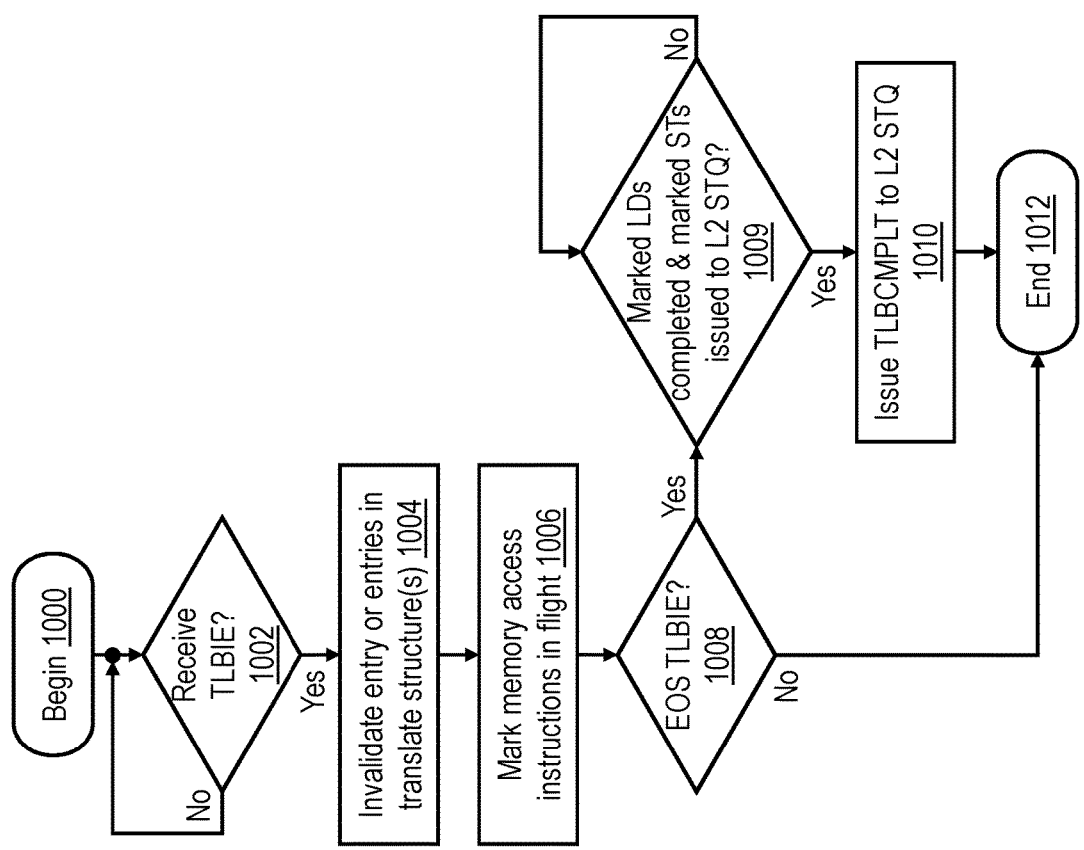
FIG. 10 is a high-level logical flowchart of an exemplary method by which a translation sequencer of a processor core processes a translation entry invalidation request in accordance with one embodiment.

Referring now to FIG. 10, there is illustrated a high-level logical flowchart of an exemplary method by which a translation sequencer 312 of an initiating or snooping processor core 200 processes a TLBIE request in accordance with one embodiment. The illustrated process is performed for each individual TLBIE request received by processor core 200 from arbiter 348.

The process shown in FIG. 10 begins at block 1000 and then proceeds to block 1002, which illustrates translation sequencer 312 awaiting receipt of a TLBIE request forwarded by arbiter 348 as described above with reference to block 924 or block 930 of FIG. 9B. In response to receipt of a TLBIE request, translation sequencer 312 invalidates one or more translation entries (e.g., PTEs or other translation entries) in translation structure(s) 310 that translate the target effective address of TLBIE request (block 1004). In addition, at block 1006, translation sequencer 312 marks all memory-referent requests that are to be drained from the processor core 200 in connection with the TLBIE requests.

In a less precise embodiment, at block 1006 translation sequencer 312 marks all memory-referent requests of all hardware threads in processor core 200 that have had their target addresses translated under the assumption that any of such memory-referent requests may have had its target address translated by a translation entry or entries invalidated by the TLBIE request received at block 1004. Thus, in this embodiment, the marked memory referent-requests would include all store requests in L1 STQ 304 and all load requests in LMQ 306. This embodiment advantageously eliminates the need to implement comparators for all entries of L1 STQ 304 and LMQ 306, but can lead to higher latency due to long drain times.

A more precise embodiment implements comparators for all entries of L1 STQ 304 and LMQ 306. In this embodiment, each comparator compares a subset of effective address bits that are specified by the TLBIE request (and that are not translated by MMU 308) with corresponding real address bits of the target real address specified in the associated entry of L1 STQ 304 or LMQ 306. In this embodiment, only the memory-referent requests for which the comparators detect a match are marked by translation sequencer 312. Thus, this more precise embodiment reduces the number of marked memory access requests at the expense of additional comparators.

In some implementations of the less precise and more precise marking embodiments, the marking applied by translation sequencer 312 is applied only to requests within processor core 200 and persists only until the marked requests drain from processor core 200. In such implementations, L2 cache 230 may revert to pessimistically assuming all store requests in flight in L2 cache 230 could have had their addresses translated by a translation entry invalidated by the TLBIE request and force all such store requests to be drained prior to processing store requests utilizing a new translation of the target effective address of the TLBIE request. In other implementations, the more precise marking applied by translation sequencer 312 can extend to store requests in flight in L2 cache 230 as well. Following block 1006, the process of FIG. 10 proceeds to block 1008.

At block 1008, translation sequencer 312 determines whether or not the TLBIE request received at block 1002 is an EOS TLBIE request that terminates a sequence of one or more TLBIE requests to be jointly processed by processor core 200. As noted above with reference to block 930, an EOS TLBIE request can be designated, for example, by the setting of a predetermined bit field in the EOS TLBIE request. In response translation sequencer 312 determining at block 1008 that the TLBIE request received at block 1002 is not an EOS TLBIE request, the process ends at block 1012. If, however, translation sequencer 312 determines that the TLBIE request received at block 1002 is an EOS TLBIE request, translation sequencer 312 iterates at block 1009 until all memory-referent requests marked at block 1006 have drained from processor core 200, that is, until all marked load-type requests are completed and all marked store-type requests have been issued from the processor core 200 to L2 STQ 320. In response to translation sequencer 312 determining at block 1009 that all marked load-type requests are completed and all marked store-type requests have been issued from the processor core 200 to L2 STQ 320, translation sequencer 312 issues a TLBCMPLT request to L2 STQ 320 to indicate the servicing of all gathered TLBIE requests is complete (block 1010). Thereafter, the process ends at block 1012.

Figure 11:
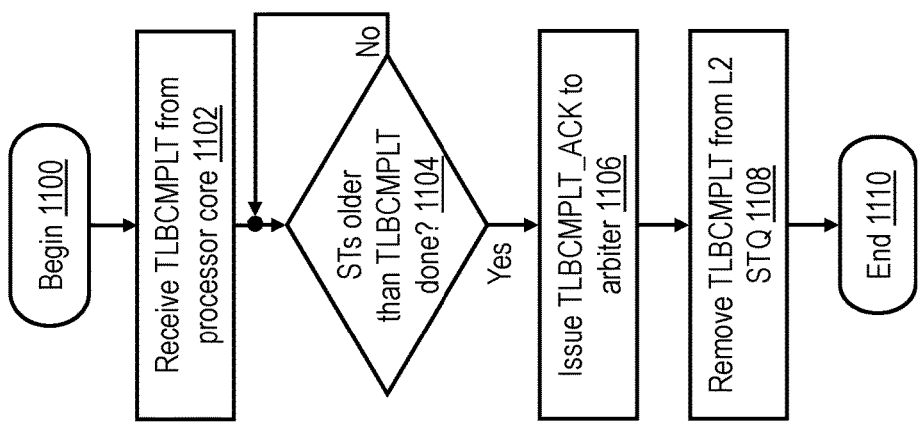
FIG. 11 is a high-level logical flowchart of an exemplary method by which a translation sequencer of a processor core processes a translation synchronization complete request in accordance with one embodiment.

Referring now to FIG. 11, there is depicted a high-level logical flowchart of an exemplary method by which an L2 STQ 320 processes a TLBCMPLT request in accordance with one embodiment. The process of FIG. 11 begins at block 1100 and then proceeds to block 1102, which illustrates L2 STQ 320 receiving and enqueuing in one of its entries a TLBCMPLT request issued by its associated processor core 200 as described above with reference to block 1010 of FIG. 10. At illustrated at block 1104, following receipt of the TLBCMPLT request L2 STQ 320 enforces store ordering by waiting until all older store requests of all hardware threads drain from L2 STQ 320 to RC machines 342 and are completed by RC machines 342. Once all of the older store requests have drained from L2 STQ 320 and are completed by RC machines 342, the process proceeds from block 1104 to block 1106, which illustrates L2 STQ 320 transmitting a TLBCMPLT_ACK signal via bus 354 to arbiter 348, which as noted above with reference to block 934 is awaiting confirmation of completion of processing of the gathered TLBIE requests. Processing of the TLBCMPLT request in L2 STQ 320 is then complete, and L2 STQ 320 removes the TLBCMPLT request from L2 STQ 320 (block 1108). Thereafter, the process ends at block 1110.

Figure 12:
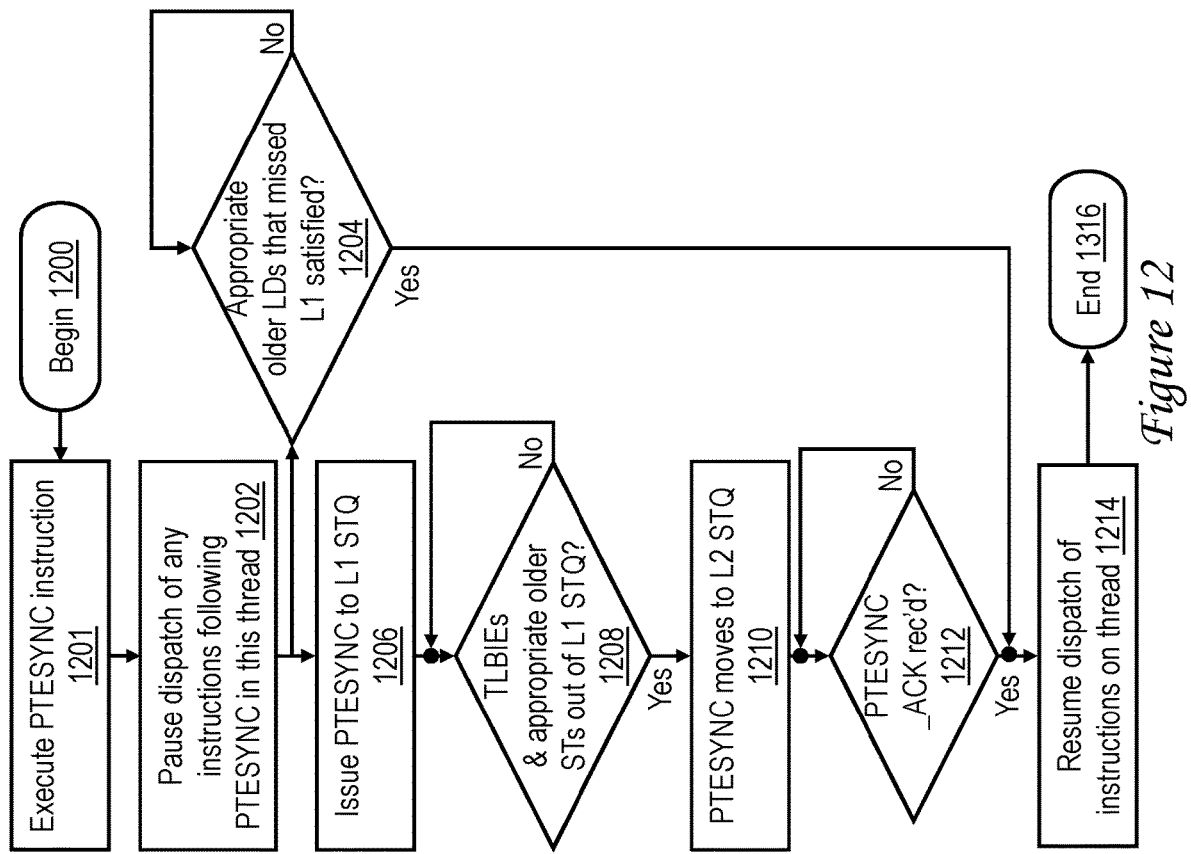
FIG. 12 is a high-level logical flowchart of an exemplary method by which a processing core processes a page table entry synchronization instruction in accordance with one embodiment.

With reference now to FIG. 12, there is illustrated a high-level logical flowchart of an exemplary method by which a processing core 200 processes a page table synchronization (e.g., PTESYNC) instruction 510 in accordance with one embodiment. As noted above, PTESYNC instruction 510 and the PTESYNC request generated by its execution have two functions, namely, ensuring systemwide completion of the TLBIE request(s) generated by TLBIE instruction(s) 426 and to enforce instruction ordering with respect to younger memory referent instructions.

The illustrated process begins at block 1200 and then proceeds to block 1201, which illustrates a processor core 200 generating a PTESYNC request by execution of a PTESYNC instruction 510 in an instruction sequence 500 in execution unit(s) 300. The PTESYNC request may include, for example, a transaction type indicating the type of the request (i.e., PTESYNC) and an indication of the initiating processor core 200 and hardware thread that issued the PTESYNC request. In response to execution of PTESYNC instruction 510, processor core 200 pauses the dispatch of any younger instructions in the initiating hardware thread (block 1202). Dispatch is paused because in the exemplary embodiment of FIG. 3 sidecar logic 322 includes only a single sidecar 324 per hardware thread of the processor core 200, meaning that in this embodiment at most one PTESYNC request per thread can be active at a time.

Following block 1202, the process of FIG. 12 proceeds in parallel to block 1204 and blocks 1206-1212. Block 1204 represents the initiating processor core 200 performing the load ordering function of the PTESYNC request by waiting for all appropriate older load requests of all hardware threads (i.e., those that would be architecturally required by a HWSYNC to receive their requested data prior to completion of processing of the HWSYNC request) to drain from LMQ 306. By waiting for these load requests to be satisfied at block 1203, it is guaranteed that the set of load requests marked at block 1006 will receive data from the correct memory page (even if the target address was on the memory page being reassigned) rather than a reassigned memory page.

In parallel with block 1204, processor core 200 also issues the PTESYNC request corresponding to PTESYNC instruction 510 to L1 STQ 304 (block 1206). The process proceeds from block 1206 to block 1208, which illustrates processor core 200 performing the store ordering function of the PTESYNC request by waiting until all appropriate older TLBIE requests and store requests of all hardware threads (i.e., those that would be architecturally required by a HWSYNC to have drained from L1 STQ 304) to drain from L1 STQ 304. Once the store ordering performed at block 1208 is complete, the PTESYNC request is issued from L1 STQ 304 to L2 STQ 320 via bus 318 as indicated at block 1210.

The process then proceeds from block 1210 to block 1212, which illustrates the initiating processor core 200 monitoring to detect receipt of a PTESYNC_ACK signal from the storage subsystem via bus 325 indicating that processing of the PTESYNC request by the initiating processor core 200 is complete. (Generation of the PTESYNC_ACK signal is described below with reference to block 1310 of FIG. 13.)

Only in response to affirmative determinations at both of blocks 1204 and 1212, the process of FIG. 12 proceeds to block 1214, which illustrates processor core 200 resuming dispatch of instructions in the initiating thread; thus, release of the thread at block 1214 allows processing of instructions following PTESYNC instruction 510 to begin. Thereafter, the process of FIG. 12 ends at block 1216.

Figure 13:
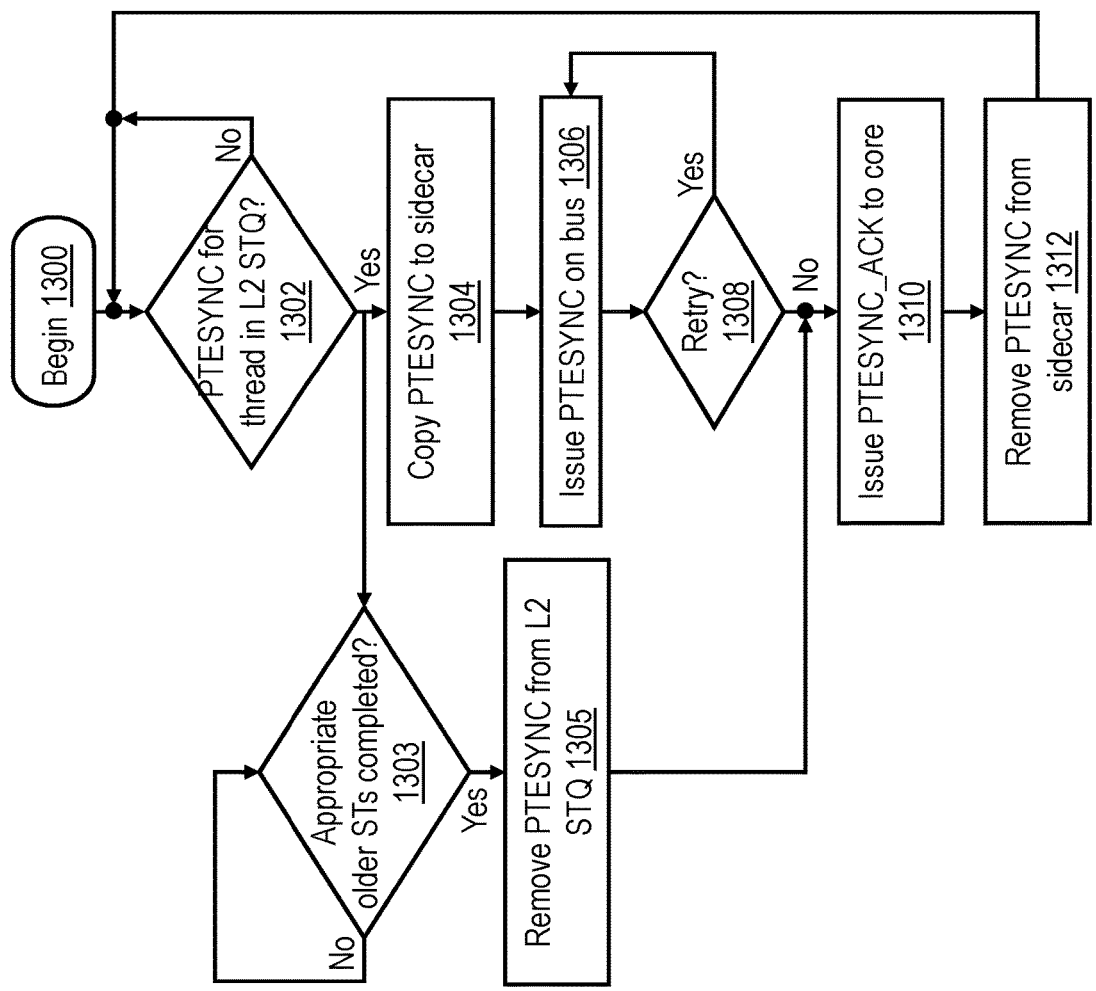
FIG. 13 is a high-level logical flowchart of an exemplary method by which a processing unit processes a page table entry synchronization request in accordance with one embodiment.

Referring now to FIG. 13, there is depicted a high-level logical flowchart of an exemplary method by which an L2 STQ 320 and its associated sidecar logic 322 of a processing unit 104 process a PTESYNC request in accordance with one embodiment. The process of FIG. 13 begins at block 1300 and then proceeds to block 1302, which depicts L2 STQ 320 monitoring for receipt of a PTESYNC request from L1 STQ 304, as described above with reference to block 1210 of FIG. 12. In response to receipt of the PTESYNC request, L2 STQ 320 and sidecar logic 324 cooperate to perform two functions, namely, (1) store ordering for store requests within L2 STQ 320 and (2) ensuring completion of the final TBLIE request in a sequence of one or more TLBIE requests at all of the other processing cores 200. In the embodiment of FIG. 13, these two functions are performed in parallel along the two paths illustrated at blocks 1303, 1305 and blocks 1304, 1306 and 1308, respectively. In alternative embodiments, these functions could instead be serialized by first performing the ordering function illustrated at blocks 1303 and 1305 and then ensuring completion of the PTESYNC request at blocks 1304, 1306, and 1308. (It should be noted that attempting to serialize the ordering of these function by ensuring completion of the PTESYNC request prior to performing store ordering can create a deadlock.)

Referring now to block 1303-1305, L2 STQ 320 performs store ordering for the PTESYNC request by ensuring that all appropriate older store requests within L2 STQ 320 have been drained from L2 STQ 320 to RC machines 342 and have completed processing in RC machines 342. The set of store requests that are ordered at block 1303 includes a first subset that may have had their target addresses translated by the translation entry invalidated by the earlier TLBIE request(s). This first subset corresponds to those marked at block 1006. In addition, the set of store requests that are ordered at block 1303 includes a second subset that includes those architecturally defined store requests would be ordered by a HWSYNC. Once all such store requests have drained from L2 STQ 320, L2 STQ 320 removes the PTESYNC request from L2 STQ 320 (block 1305). Removal of the PTESYNC request allows store requests younger than the PTESYNC request to flow through L2 STQ 320, thus preventing deadlock.

Referring now to block 1304, sidecar logic 322 detects the presence of the PTESYNC request in L2 STQ 320 and copies the PTESYNC request to the appropriate sidecar 324 via interface 321 prior to removal of the PTESYNC request from L2 STQ 320 at block 1305. The process then proceeds to the loop illustrated at blocks 1306 and 1308 in which sidecar logic 322 continues to issue PTESYNC requests on system fabric 110, 114 until no processor core 200 responds with a Retry coherence response (i.e., until the preceding TLBIE request of the same processor core and hardware thread has been completed by all snooping processor cores 200 as indicated by an alternative coherence response (e.g., Ack, Null, etc.).

Only in response to completion of both of the functions depicted at blocks 1303, 1305 and blocks 1304, 1306 and 1308, the process proceeds to block 1310, which illustrates sidecar logic 322 issuing a PTESYNC_ACK signal to the affiliated processor core 200 via bus 325, which is awaited by the issuing hardware thread at block 1212 of FIG. 12. Sidecar logic 322 then removes the PTESYNC request from the sidecar 324 (block 1312), and the process returns to block 1302, which has been described.

Figure 14:
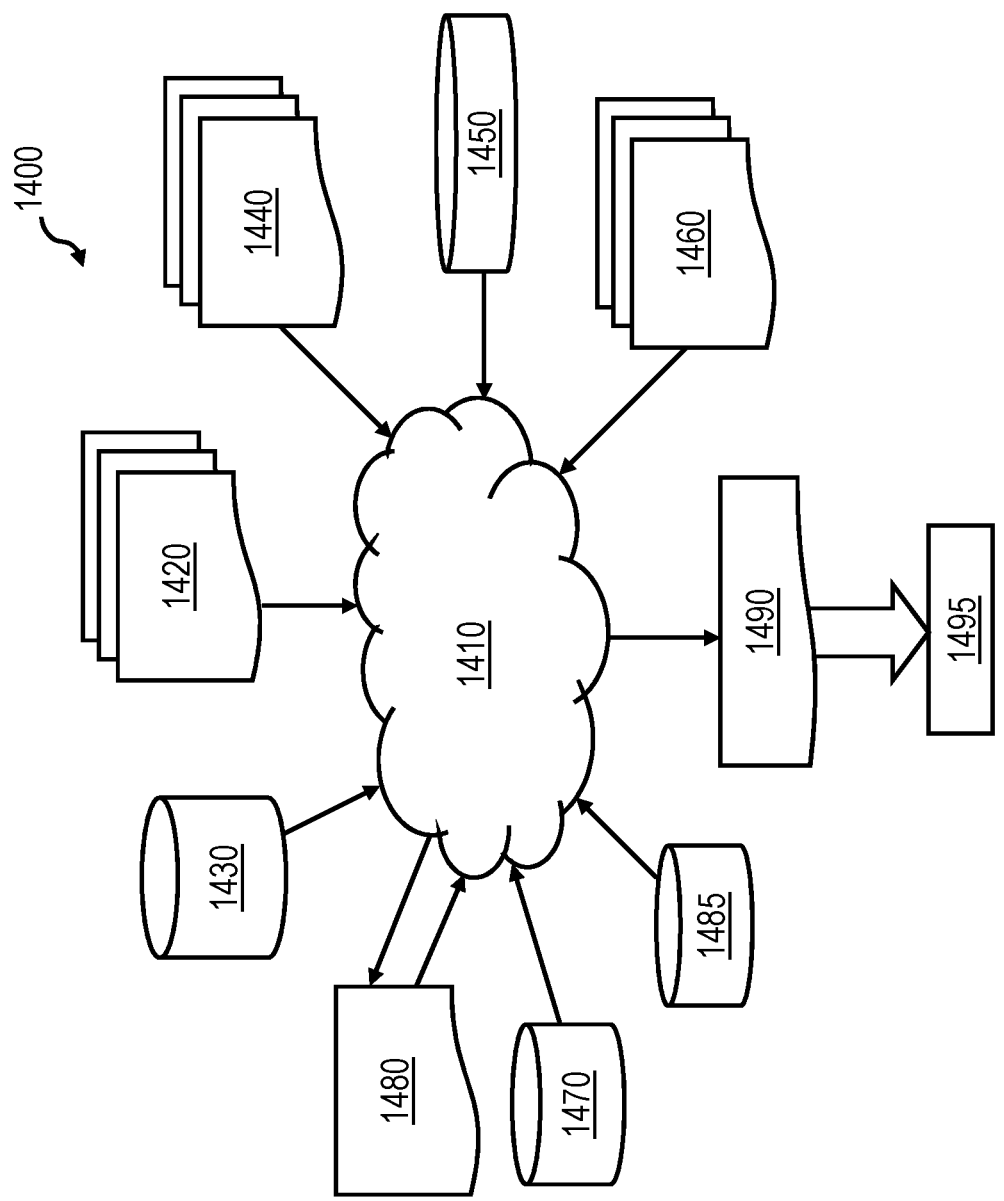
FIG. 14 is a data flow diagram illustrating a design process.

With reference now to FIG. 14, there is depicted a block diagram of an exemplary design flow 1400 used for example, in semiconductor IC logic design, simulation, test, layout, and manufacture. Design flow 1400 includes processes, machines and/or mechanisms for processing design structures or devices to generate logically or otherwise functionally equivalent representations of the design structures and/or devices described above and shown in FIGS. 1-4. The design structures processed and/or generated by design flow 1400 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1400 may vary depending on the type of representation being designed. For example, a design flow 1400 for building an application specific IC (ASIC) may differ from a design flow 1400 for designing a standard component or from a design flow 1400 for instantiating the design into a programmable array, for example a programmable gate array (PGA) or a field programmable gate array (FPGA) offered by Altera® Inc. or Xilinx® Inc.

FIG. 14 illustrates multiple such design structures including an input design structure 1420 that is preferably processed by a design process 1416. Design structure 1420 may be a logical simulation design structure generated and processed by design process 1416 to produce a logically equivalent functional representation of a hardware device. Design structure 1420 may also or alternatively comprise data and/or program instructions that when processed by design process 1416, generate a functional representation of the physical structure of a hardware device. Whether representing functional and/or structural design features, design structure 1420 may be generated using electronic computer-aided design (ECAD) such as implemented by a core developer/designer. When encoded on a machine-readable data transmission, gate array, or storage medium, design structure 1420 may be accessed and processed by one or more hardware and/or software modules within design process 1416 to simulate or otherwise functionally represent an electronic component, circuit, electronic or logic module, apparatus, device, or system such as those shown in FIGS. 1-4. As such, design structure 1420 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1416 preferably employs and incorporates hardware and/or software modules for synthesizing, translating, or otherwise processing a design/simulation functional equivalent of the components, circuits, devices, or logic structures shown in FIGS. 1-4 to generate a netlist 1480 which may contain design structures such as design structure 1420. Netlist 1480 may comprise, for example, compiled or otherwise processed data structures representing a list of wires, discrete components, logic gates, control circuits, I/O devices, models, etc. that describes the connections to other elements and circuits in an integrated circuit design. Netlist 1480 may be synthesized using an iterative process in which netlist 1480 is resynthesized one or more times depending on design specifications and parameters for the device. As with other design structure types described herein, netlist 1480 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 1416 may include hardware and software modules for processing a variety of input data structure types including netlist 1480. Such data structure types may reside, for example, within library elements 1430 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1440, characterization data 1450, verification data 1460, design rules 1470, and test data files 1485 which may include input test patterns, output test results, and other testing information. Design process 1416 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1416 without deviating from the scope and spirit of the invention. Design process 1416 may also include modules for performing standard circuit design processes such as timing analysis, verification, design rule checking, place and route operations, etc.

Design process 1416 employs and incorporates logic and physical design tools such as HDL compilers and simulation model build tools to process design structure 1420 together with some or all of the depicted supporting data structures along with any additional mechanical design or data (if applicable), to generate a second design structure 1490. Design structure 1490 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 1420, design structure 1490 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-4. In one embodiment, design structure 1490 may comprise a compiled, executable HDL simulation model that functionally simulates the devices shown in FIGS. 1-4.

Design structure 1490 may also employ a data format used for the exchange of layout data of integrated circuits and/or symbolic data format (e.g., information stored in a GDSII (GDS2), GL1, OASIS, map files, or any other suitable format for storing such design data structures). Design structure 1490 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1-4. Design structure 1490 may then proceed to a stage 1495 where, for example, design structure 1490: proceeds to tape-out, is released to manufacturing, is released to a mask house, is sent to another design house, is sent back to the customer, etc.

As has been described, in at least one embodiment, an arbiter gathers translation invalidation requests assigned to state machines of a lower-level cache into a set for joint handling in a processor core. The gathering includes selection of one of the set of gathered translation invalidation requests as an end-of-sequence (EOS) request. The arbiter issues to the processor core a sequence of the gathered translation invalidation requests terminating with the EOS request. Based on receipt of each of the gathered requests, the processor core invalidates any translation entries providing translation for the addresses specified by the translation invalidation requests and marks memory-referent requests dependent on the invalidated translation entries. Based on receipt of the EOS request and in response to all of the marked memory-referent requests draining from the processor core, the processor core issues a completion request to the lower-level cache indicating completion of servicing by the processor core of the set of gathered translation invalidation requests.

While various embodiments have been particularly shown and described, it will be understood by those skilled in the art that various changes in form and detail may be made therein without departing from the spirit and scope of the appended claims and these alternate implementations all fall within the scope of the appended claims. For example, although aspects have been described with respect to a computer system executing program code that directs the functions of the present invention, it should be understood that present invention may alternatively be implemented as a program product including a computer-readable storage device storing program code that can be processed by a processor of a data processing system to cause the data processing system to perform the described functions. The computer-readable storage device can include volatile or non-volatile memory, an optical or magnetic disk, or the like, but excludes non-statutory subject matter, such as propagating signals per se, transmission media per se, and forms of energy per se.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A method of invalidating translation entries in a processor core of a multithreaded data processing system, the method comprising:
   assigning a plurality of translation invalidation requests to a corresponding plurality of state machines in a lower-level cache for concurrent handling, wherein each of the plurality of translation invalidation requests specifies an address for which corresponding address translation entries in the processor core are to be invalidated;
   gathering, by an arbiter circuit, multiple of the plurality of translation invalidation requests assigned to the plurality of state machines into a set of gathered translation invalidation requests for joint handling in the processor core, wherein the gathering includes the arbiter circuit selecting one of the set of gathered translation invalidation requests as an end-of-sequence (EOS) translation invalidation request;
   issuing, by the arbiter circuit to the processor core, a sequence of the gathered translation invalidation requests terminating with the EOS translation invalidation request;
   based on receipt of each of the gathered translation invalidation requests in the set of gathered translation invalidation requests, the processor core invalidating any translation entries in the processor core providing translation for the address specified by said each of the translation invalidation requests and marking memory-referent requests in the processor core for which address translation was previously performed by reference to invalidated translation entries; and
   based on receipt of the EOS translation invalidation request of the set of gathered translation invalidation requests and in response to all of the marked memory-referent requests draining from the processor core, the processor core issuing a completion request to the lower-level cache indicating completion of servicing by the processor core of all of the multiple gathered translation invalidation requests in the set.

2. The method of claim 1, further comprising:
   the arbiter controlling inclusion of translation invalidation requests in the set of gathered translation invalidation requests by implementing a gather window.

3. The method of claim 2, further comprising the arbiter dynamically adjusting a duration of the gather window based on frequency of receipt of TLBIE requests by the plurality of state machines.

4. The method of claim 1, further comprising:
   the arbiter controlling inclusion of translation invalidation requests in the set of gathered translation invalidation requests by implementing a maximum gather size.

5. The method of claim 1, wherein the gathering includes:
   the arbiter adding at least one translation invalidation request to the set of gathered translation invalidation requests after initiating the issuing; and
   reassigning one of the at least one translation invalidation request added to the set of gathered translation invalidation requests as the EOS translation invalidation request.

6. The method of claim 1, wherein the lower-level cache includes a store queue and wherein the method further comprises:
  the lower-level cache releasing for reassignment those state machines assigned translation invalidation requests in the set of translation invalidation requests based on determining all store-type requests in the lower-level cache older than completion request have drained from the store queue.

7. A processing unit, comprising:
  a processor core including:
    an execution unit that executes memory-referent instructions to generate memory-referent requests;
    a translation structure that caches translation entries;
    a memory management unit that translates effective addresses to real addresses by reference to the translation structure;
    a translation sequencer circuit;
  a lower-level cache coupled to the processor core, wherein the lower-level cache includes:
    a cache array;
    a plurality of state machines configured to be assigned a corresponding plurality of translation invalidation requests for concurrent handling, wherein each of the plurality of translation invalidation requests specifies an address for which corresponding address translation entries in the processor core are to be invalidated;
    an arbiter circuit communicatively coupled to the plurality of state machines, wherein the arbiter circuit is configured to gather multiple of the plurality of translation invalidation requests assigned to the plurality of state machines into a set of gathered translation invalidation requests for joint handling in the processor core, wherein the gathering includes the arbiter circuit selecting one of the set of gathered translation invalidation requests as an end-of-sequence (EOS) translation invalidation request, and wherein the arbiter circuit is configured to issue, to the translation sequencer, a sequence of the gathered translation invalidation requests terminating with the EOS translation invalidation request;
  wherein the translation sequencer circuit is configured to perform:
    based on receipt of each of the gathered translation invalidation requests in the set of gathered translation invalidation requests, invalidating any translation entries in the processor core providing translation for the address specified by said each of the translation invalidation requests and marking memory-referent requests in the processor core for which address translation was previously performed by reference to invalidated translation entries; and
    based on receipt of the EOS translation invalidation request of the set of gathered translation invalidation requests and in response to all of the marked memory-referent requests draining from the processor core, issuing a completion request to the lower-level cache indicating completion of servicing by the processor core of all of the multiple gathered translation invalidation requests in the set.

8. The processing unit of claim 7, wherein the arbiter is configured to control inclusion of translation invalidation requests in the set of gathered translation invalidation requests by implementing a gather window.

9. The processing unit of claim 8, wherein the arbiter is configured to dynamically adjust a duration of the gather window based on frequency of receipt of TLBIE requests by the plurality of state machines.

10. The processing unit of claim 7, wherein the arbiter is configured to control inclusion of translation invalidation requests in the set of gathered translation invalidation requests by implementing a maximum gather size.

11. The processing unit of claim 7, wherein the gathering includes:
  the arbiter adding at least one translation invalidation request to the set of gathered translation invalidation requests after initiating the issuing; and
  reassigning one of the at least one translation invalidation request added to the set of gathered translation invalidation requests as the EOS translation invalidation request.

12. The processing unit of claim 7, wherein:
  the lower-level cache includes a store queue; and
  the lower-level cache is configured to release for reassignment those state machines assigned translation invalidation requests in the set of translation invalidation requests based on determining all store-type requests in the lower-level cache older than completion request have drained from the store queue.

13. A design structure tangibly embodied in a machine-readable storage device for designing, manufacturing, or testing an integrated circuit, the design structure comprising:
  a processing unit, comprising:
    a processor core including:
      an execution unit that executes memory-referent instructions to generate memory-referent requests;
      a translation structure that caches translation entries;
      a memory management unit that translates effective addresses to real addresses by reference to the translation structure;
      a translation sequencer circuit;
    a lower-level cache coupled to the processor core, wherein the lower-level cache includes:
      a cache array;
      a plurality of state machines configured to be assigned a corresponding plurality of translation invalidation requests for concurrent handling, wherein each of the plurality of translation invalidation requests specifies an address for which corresponding address translation entries in the processor core are to be invalidated;
      an arbiter circuit communicatively coupled to the plurality of state machines, wherein the arbiter circuit is configured to gather multiple of the plurality of translation invalidation requests assigned to the plurality of state machines into a set of gathered translation invalidation requests for joint handling in the processor core, wherein the gathering includes the arbiter circuit selecting one of the set of gathered translation invalidation requests as an end-of-sequence (EOS) translation invalidation request, and wherein the arbiter circuit is configured to issue, to the translation sequencer, a sequence of the gathered translation invalidation requests terminating with the EOS translation invalidation request;
    wherein the translation sequencer circuit is configured to perform:
      based on receipt of each of the gathered translation invalidation requests in the set of gathered translation invalidation requests, invalidating any translation entries in the processor core providing translation for the address specified by said each of the translation invalidation requests and marking memory-referent requests in the processor core for which address translation was previously performed by reference to invalidated translation entries; and based on receipt of the EOS translation invalidation request of the set of gathered translation invalidation requests and in the set in response to all of the marked memory-referent requests draining from the processor core, issuing a completion request to the lower-level cache indicating completion of servicing by the processor core of all of the multiple gathered translation invalidation requests.

14. The design structure of claim 13, wherein the arbiter is configured to control inclusion of translation invalidation requests in the set of gathered translation invalidation requests by implementing a gather window.

15. The design structure of claim 14, wherein the arbiter is configured to dynamically adjust a duration of the gather window based on frequency of receipt of TLBIE requests by the plurality of state machines.

16. The design structure of claim 13, wherein the arbiter is configured to control inclusion of translation invalidation requests in the set of gathered translation invalidation requests by implementing a maximum gather size.

17. The design structure of claim 13, wherein the gathering includes:

the arbiter adding at least one translation invalidation request to the set of gathered translation invalidation requests after initiating the issuing; and reassigning one of the at least one translation invalidation request added to the set of gathered translation invalidation requests as the EOS translation invalidation request.

18. The design structure of claim 13, wherein:

the lower-level cache includes a store queue; and the lower-level cache is configured to release for reassignment those state machines assigned translation invalidation requests in the set of translation invalidation requests based on determining all store-type requests in the lower-level cache older than completion request have drained from the store queue.

* * * * *